(12) United States Patent
Sakaniwa et al.

(10) Patent No.: US 9,485,438 B2
(45) Date of Patent: Nov. 1, 2016

(54) IMAGE PROCESSING SYSTEM WITH IMAGE CONVERSION UNIT THAT COMPOSITES OVERHEAD VIEW IMAGES AND IMAGE PROCESSING METHOD

(71) Applicant: Clarion Co., Ltd., Saitama-shi, Saitama (JP)

(72) Inventors: Hidenori Sakaniwa, Tokyo (JP); Yoshitaka Uchida, Saitama (JP); Katsuo Onozaki, Saitama (JP); Haruhiko Higuchi, Saitama (JP); Mitsuo Nakajima, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 0 days.

(21) Appl. No.: 14/439,088

(22) PCT Filed: Oct. 29, 2013

(86) PCT No.: PCT/JP2013/079297
§ 371 (c)(1),
(2) Date: Apr. 28, 2015

(87) PCT Pub. No.: WO2014/069471
PCT Pub. Date: May 8, 2014

(65) Prior Publication Data
US 2015/0281594 A1    Oct. 1, 2015

(30) Foreign Application Priority Data

Oct. 31, 2012   (JP) ................... 2012-239819

(51) Int. Cl.
*H04N 5/225*      (2006.01)
*H04N 5/265*      (2006.01)
(Continued)

(52) U.S. Cl.
CPC ............ *H04N 5/265* (2013.01); *G06T 3/4038* (2013.01); *G06T 5/008* (2013.01); *G06T 5/50* (2013.01);
(Continued)

(58) Field of Classification Search
CPC ..................................................... H04N 5/265
USPC .................................. 348/159, 211.11, 218.1
See application file for complete search history.

(56) References Cited

U.S. PATENT DOCUMENTS

| 2008/0043113 A1 | 2/2008 | Ishii |
| 2012/0170812 A1* | 7/2012 | Kamiyama ............... B60R 1/00 382/103 |
| 2012/0219190 A1 | 8/2012 | Kumagai |

FOREIGN PATENT DOCUMENTS

| EP | 2 437 494 A1 | 4/2012 |
| EP | 2 482 557 A1 | 8/2012 |

(Continued)

OTHER PUBLICATIONS

International Search Report (PCT/ISA/210) dated Dec. 10, 2013, with English translation (Four (4) pages).

(Continued)

*Primary Examiner* — Usman Khan
(74) *Attorney, Agent, or Firm* — Crowell & Moring LLP

(57) ABSTRACT

An image detection unit extracts image feature values from images of each camera. An image conversion unit computes a blend rate according to the image feature values and composites an image of a superposition area wherein a plurality of camera images overlap. An assessment is made of a correspondence of the image feature values of each image in the superposition area, and a determination is made that a solid object is present if the correlation is weak. Furthermore, a determination is made that the solid object is present in the superposition area if the image feature values in each image have locationally overlapping portions. In such a circumstance, the image is composited with the blend rate of the image with a greater image feature value set large.

15 Claims, 17 Drawing Sheets

(51) Int. Cl.
*H04N 7/18* (2006.01)
*G06T 5/00* (2006.01)
*G06T 5/50* (2006.01)
*G06T 3/40* (2006.01)

(52) U.S. Cl.
CPC ..... *H04N 7/181* (2013.01); *G06T 2207/20012* (2013.01); *G06T 2207/20221* (2013.01); *G06T 2207/30252* (2013.01)

(56) References Cited

FOREIGN PATENT DOCUMENTS

| EP | 2 739 050 A1 | 6/2014 |
| JP | 7-223487 A | 8/1995 |
| JP | 2002-354468 A | 12/2002 |
| JP | 2007-41791 A | 2/2007 |
| JP | 2007-295043 A | 11/2007 |
| JP | 2009-40107 A | 2/2009 |
| JP | 2009-289185 A | 12/2009 |
| JP | 2012-86684 A | 5/2012 |
| WO | WO 2010/119734 A1 | 10/2010 |
| WO | WO 2012/144053 A | 10/2012 |

OTHER PUBLICATIONS

Japanese-language Office Action issued in counterpart Japanese Application No. 2012-239819 dated May 31, 2016 (2 pages).
Supplementary Partial European Search Report issued in counterpart European Application No. 13850153.1 dated Jun. 14, 2016 (eight (8) pages).

* cited by examiner

F I G. 3
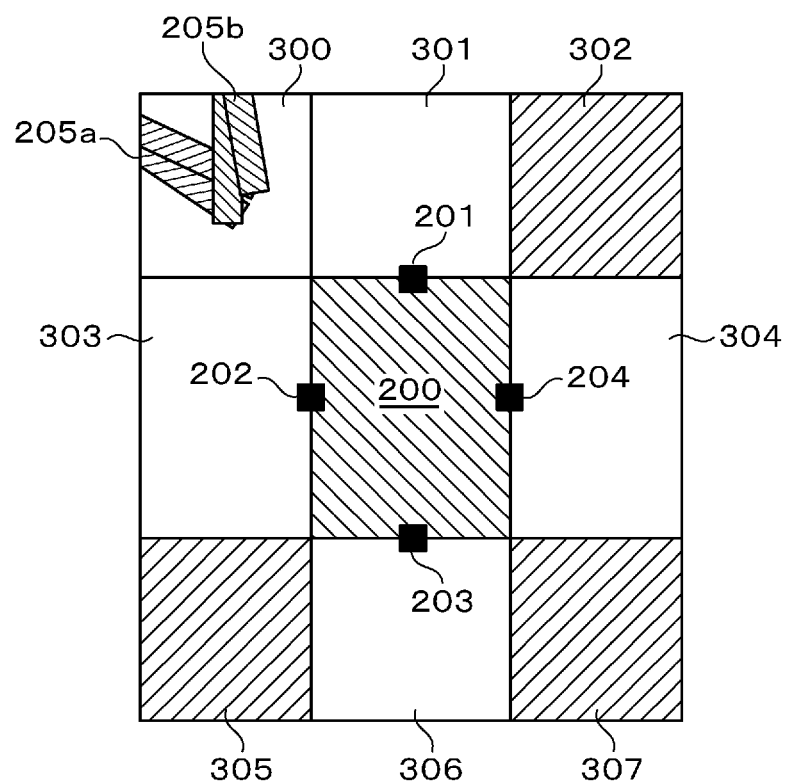

F I G. 5 A
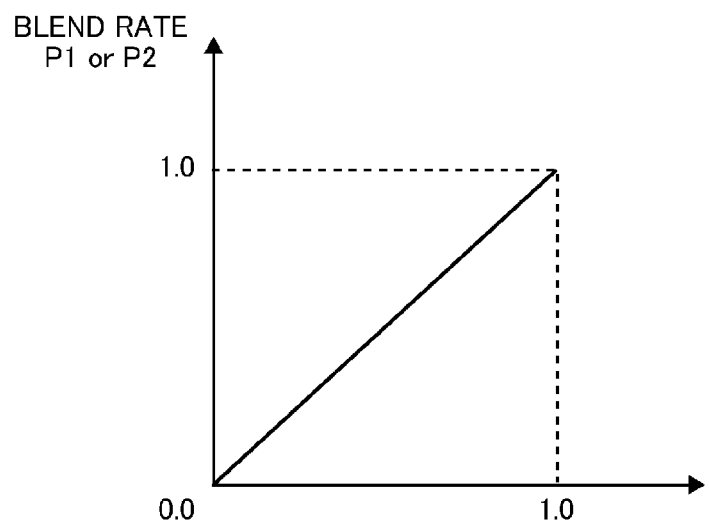
F I G. 5 B
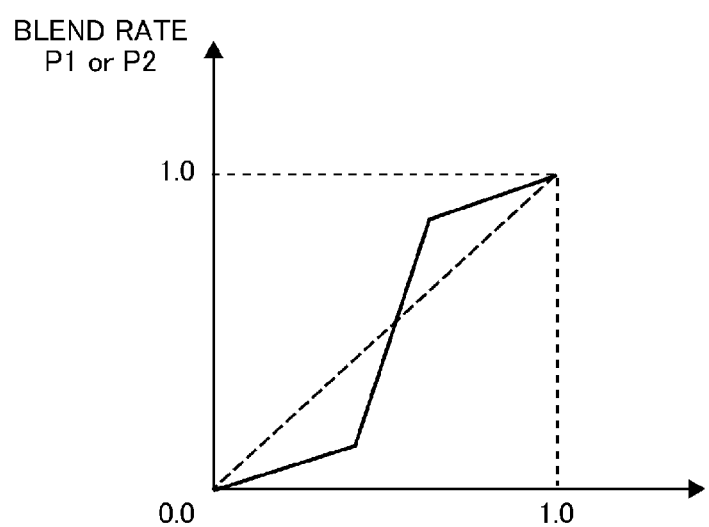

F I G. 6
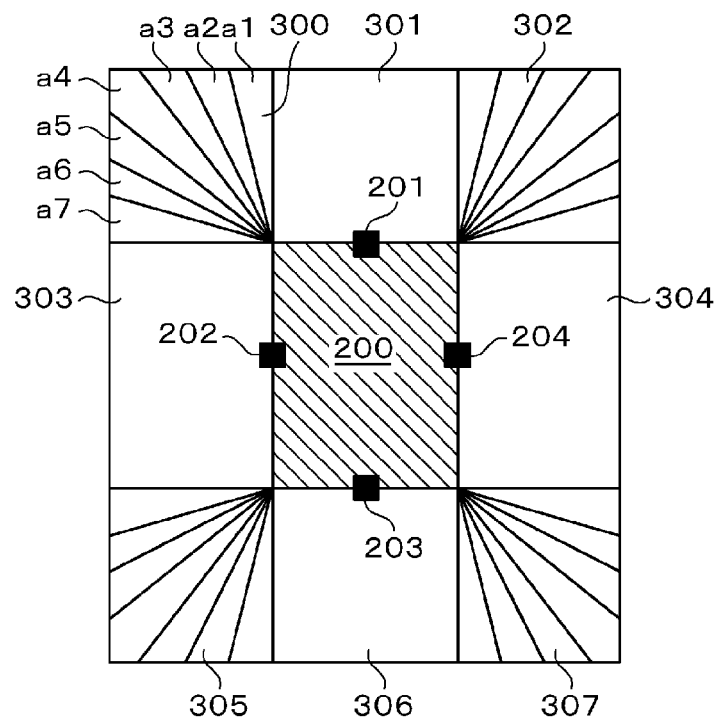
F I G. 7
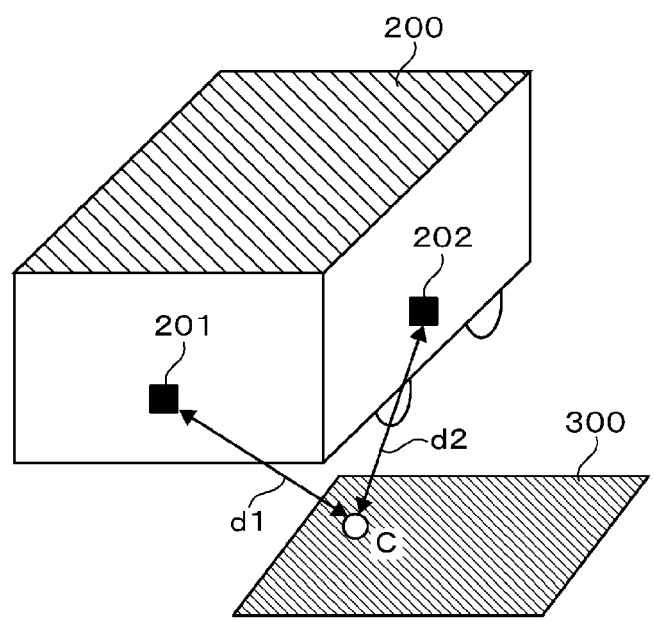

F I G. 1 0
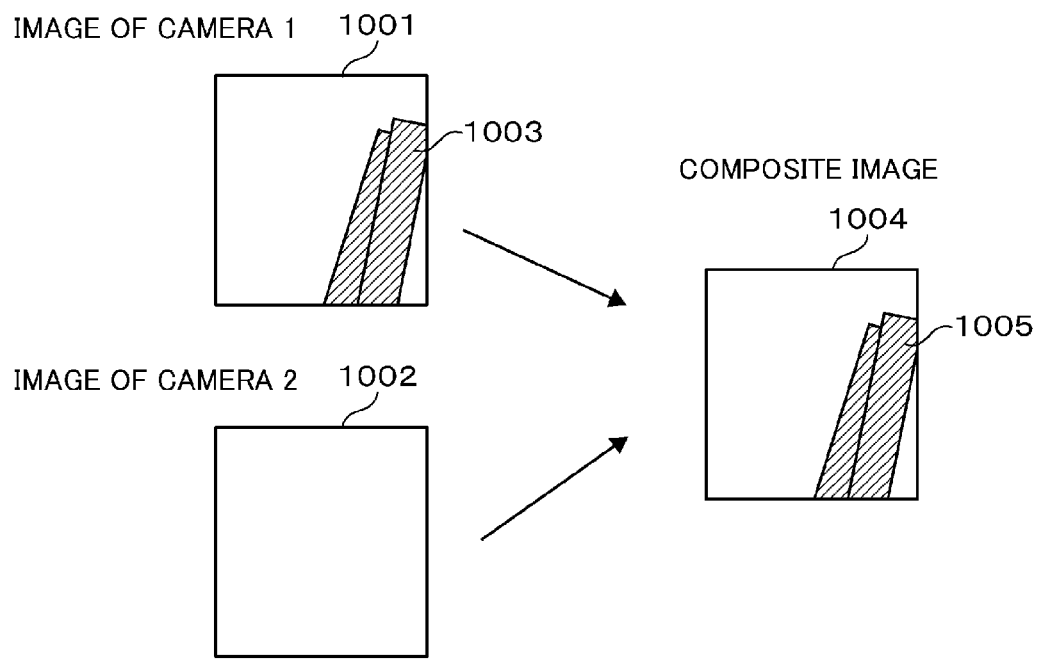
F I G. 1 1
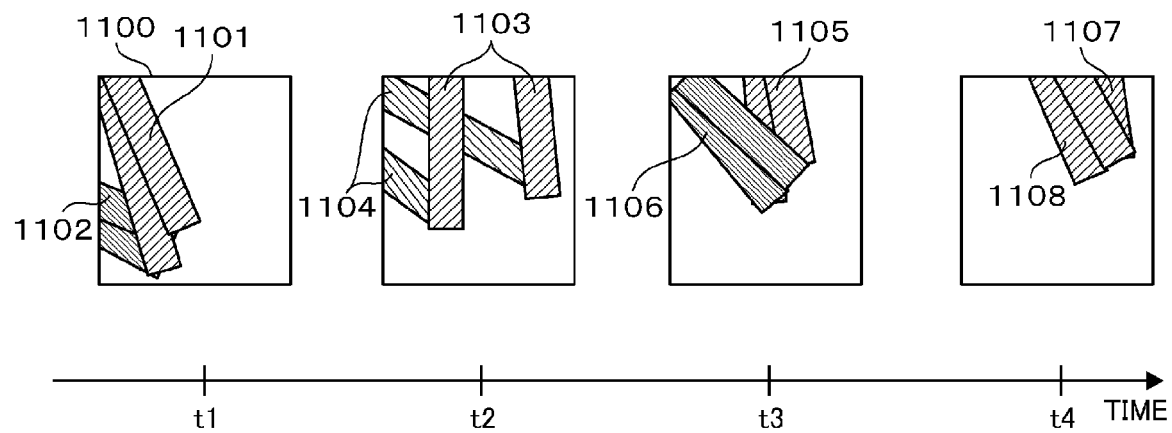

F I G. 1 4
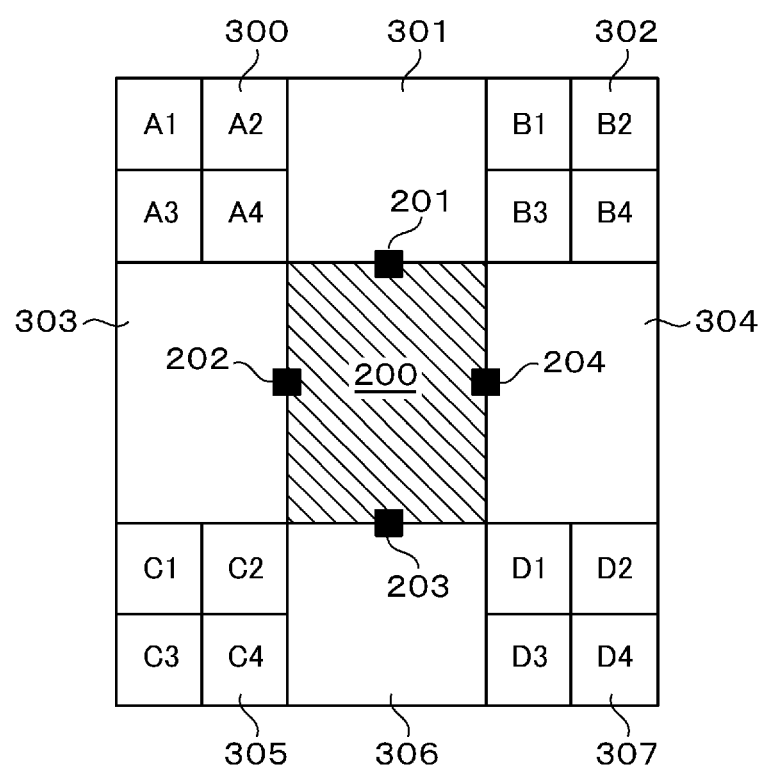

FIG. 15

| DIRECTION OF MOVEMENT | DIRECTION OF STEERING WHEEL | SPEED (V<X, S<X) | DANGER DEGREE (LARGE) DISPLAY AREA | DANGER DEGREE (MEDIUM) DISPLAY AREA | DANGER DEGREE (SMALL) DISPLAY AREA |
|---|---|---|---|---|---|
| FORWARD MOVEMENT | LEFT | FAST (V>S) | A1,A2,A3,A4 | B1,B3,C2,D1 | B2,B4,C1,D2 |
| | | SLOW (V≤S) | A2,A3,A4 | A1,B3,C2,D1 | B1,C1,D2 |
| | RIGHT | FAST (V>S) | ,, | ,, | ,,** |
| | | SLOW (V≤S) | ,, | ,, | ,,** |
| BACKWARD MOVEMENT | LEFT | FAST (V>S) | C1,C2,C3,C4 | A4,B3,C4,D1 | A1,B2 |
| | | SLOW (V≤S) | ,, | ,, | ,,** |
| | RIGHT | FAST (V>S) | ,, | ,, | ,,** |
| | | SLOW (V≤S) | ,, | ,, | ,,** |

F I G. 1 6
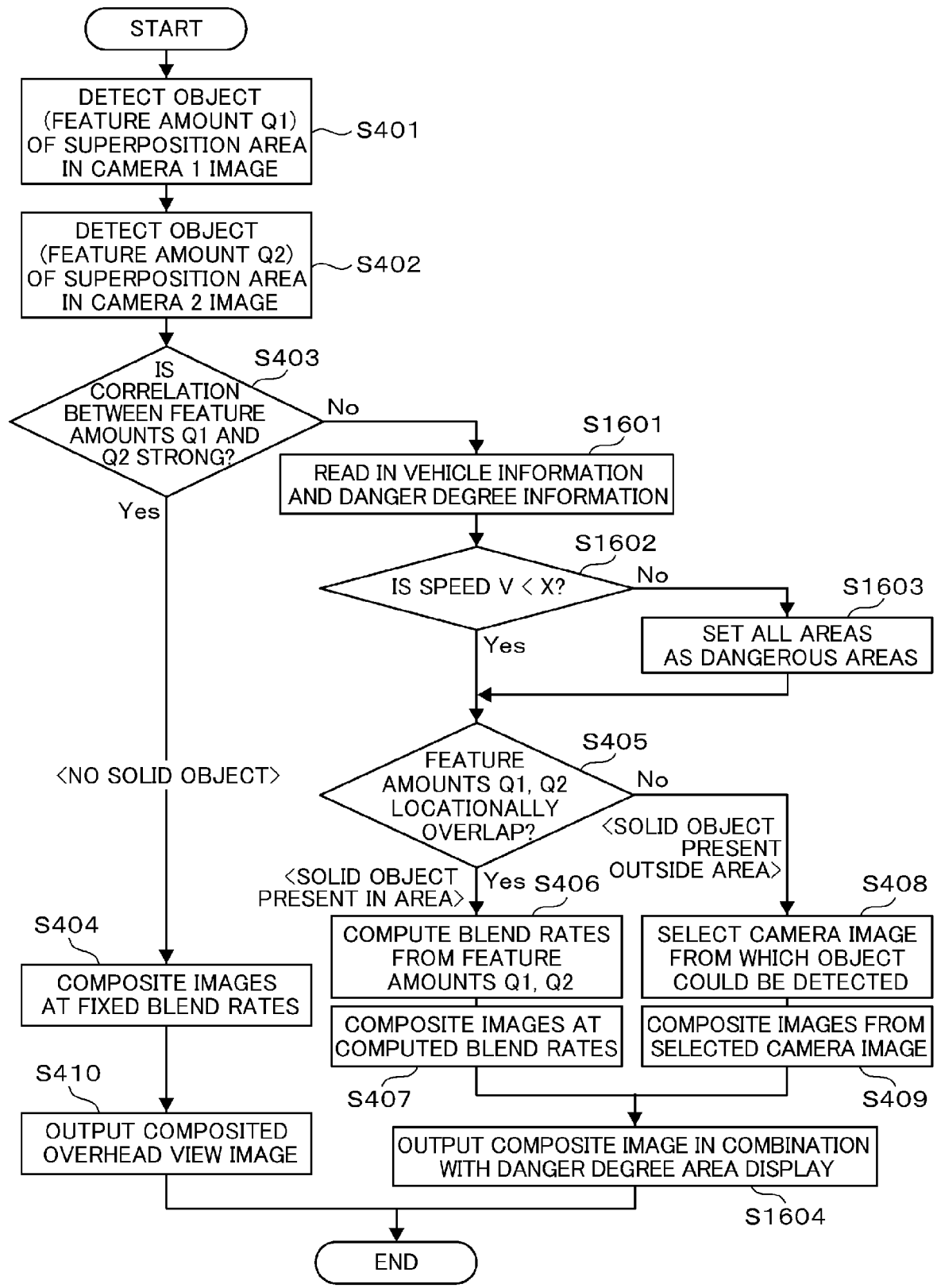

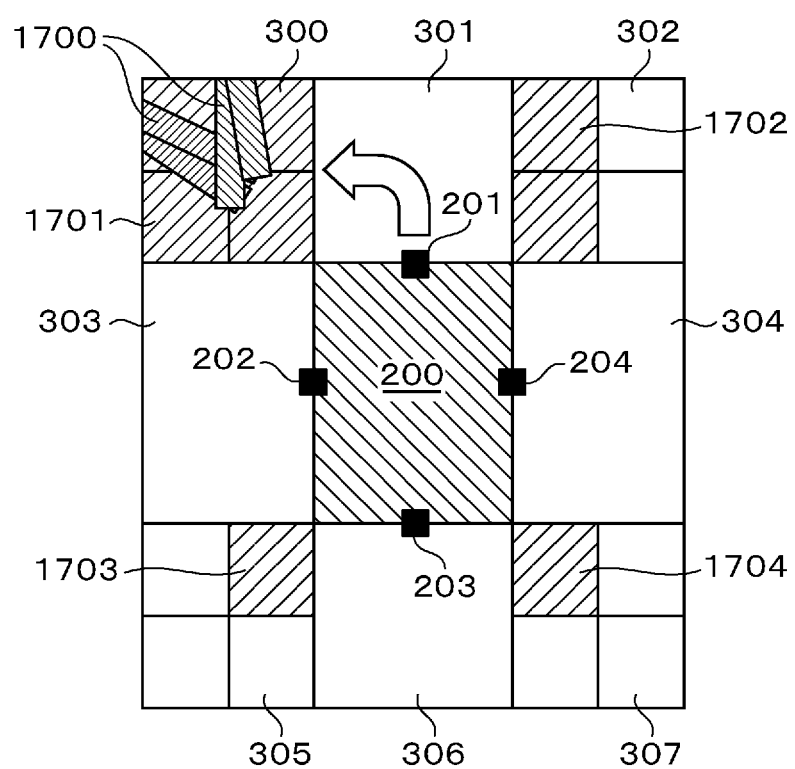
F I G. 1 7

F I G. 1 8
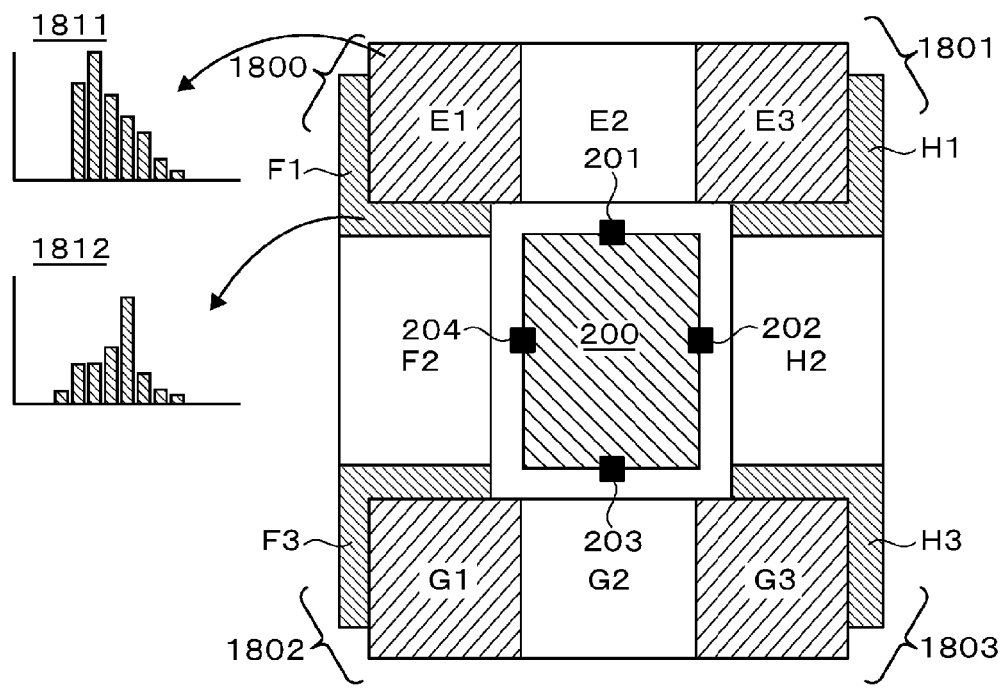
F I G. 1 9
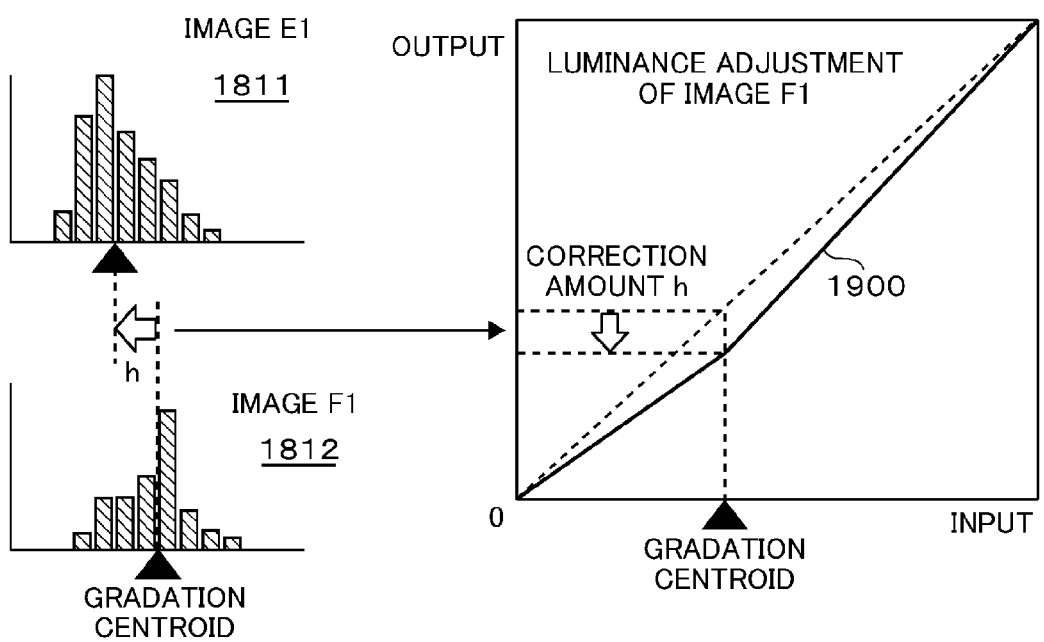

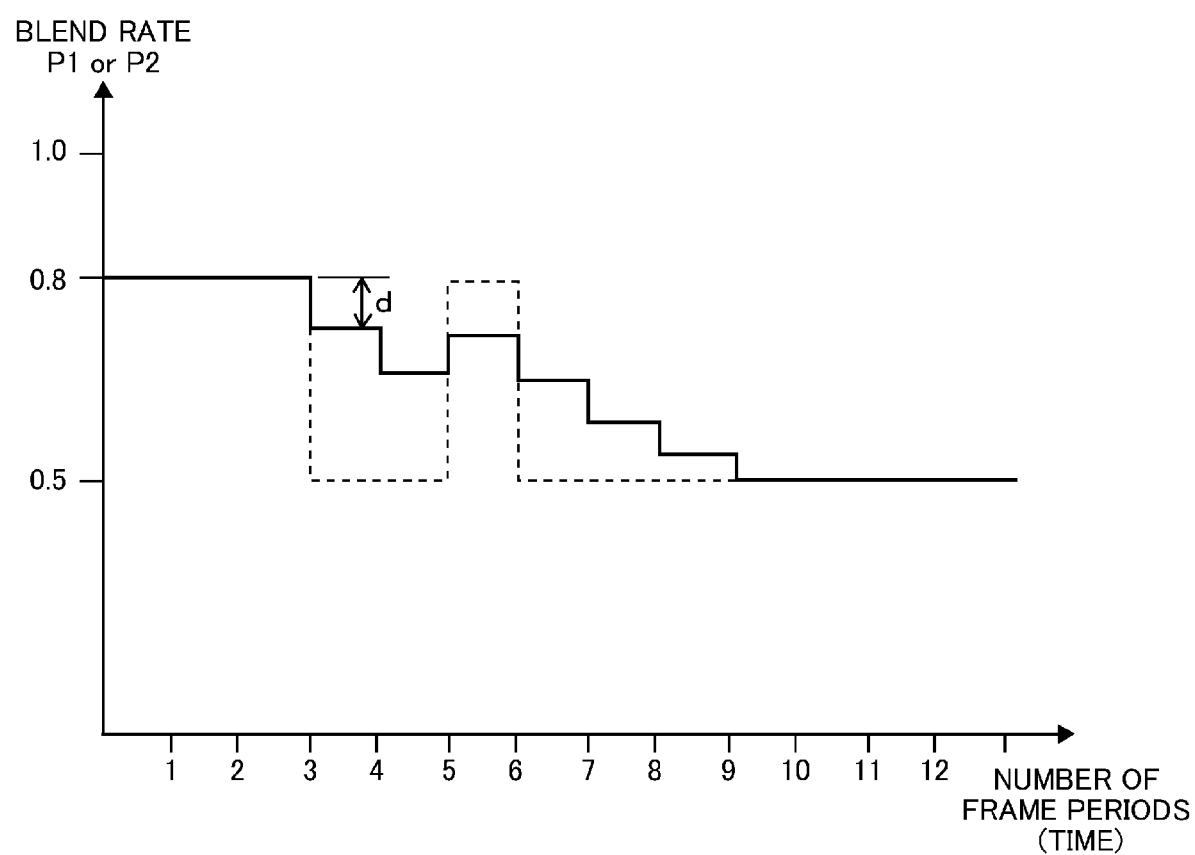
F I G. 2 3

IMAGE PROCESSING SYSTEM WITH IMAGE CONVERSION UNIT THAT COMPOSITES OVERHEAD VIEW IMAGES AND IMAGE PROCESSING METHOD

TECHNICAL FIELD

The present invention relates to an image processing system and an image processing method of compositing photographed images from a plurality of cameras.

BACKGROUND ART

In order to support vehicle driving, there is utilized an image processing system that creates and displays an overhead view image around a vehicle by photographing the surrounding of the vehicle by the plurality of cameras that have been respectively installed on the front, the back and both of the left and right sides of the vehicle, performing viewpoint conversion on these photographed images and joining together the respective images. On that occasion, although regions that the adjacent cameras photograph mutually overlap on a joint thereof, conventionally, one overhead view image has been created by selecting the photographed image to be used for display in accordance with a certain standard. However, in this technique, discontinuity arises on the joint and further in a case where there are present a pedestrian and an obstacle in the vicinity of the joint, such a problem arises that it falls into an a situation that it becomes difficult to recognize them.

As a countermeasure to this problem, in Patent Literature 1, there is disclosed a technique of alternately arranging pixels in accordance with a certain role in the region in which the plurality of images overlap. In addition, in Patent Literature 2, there is disclosed a technique of deciding whether the obstacle is present on a joint portion of an overhead view image to be displayed so as to change a position that the joint portion of the overhead view image locates is disclosed. In addition, in Patent Literature 3, there is disclosed a technique of, in a case where a solid object is present in an area where field images by two cameras overlap, setting a boundary line along which the field images by the two cameras in the area concerned are to be composited such that only the image by one camera is left on a composite image in regard to the image of the solid object concerned. In addition, in Patent Literature 4, there are disclosed a technique of setting the boundary line similar to the boundary line in Patent Literature 3 and a technique of, in a case where the obstacle is present in the area where the field images by the two cameras overlap, setting composition weighting of an image of the obstacle by one camera as 1 and composition weighting of the image of the obstacle by the other camera as 0, weighting 0.5 to a portion other than the obstacle in the image by each of the cameras and compositing together them.

CITATION LIST

Patent Literature

Patent Literature 1: Japanese Unexamined Patent Application Publication No. 2002-354468
Patent Literature 2: Japanese Unexamined Patent Application Publication No. 2007-41791
Patent Literature 3: WO2010/119734
Patent Literature 4: Japanese Unexamined Patent Application Publication No. 2009-289185

SUMMARY OF INVENTION

Technical Problem

In the technique of Patent Literature 1, since the pixels of the images that have been photographed by the two cameras are alternately arranged, there is such a problem that the image becomes unclear and the solid object is displayed as a double image. In addition, in the technique of Patent Literature 2, there is such a problem that although the joint portion is moved, the joint, it results in joining that switching of the image of a newly created joint becomes discontinuous on an end of a photographing range. Also in the boundary line setting techniques in Patent Literature 3 and Patent Literature 4, likewise, there is such a problem that switching of the image on the boundary line portion becomes discontinuous. In addition, in the weighted composition technique in Patent Literature 4, only the technique of selecting weighting of the image of one camera in two values of 0 or 1 is disclosed in regard to the image portion of the obstacle. In this technique, if a process of separating the image of the obstacle from a background image results in failure, an extremely unnatural composite image will be generated. Therefore, there is such a problem that it is necessary to separate the image of the obstacle from the background image with extremely high precision, a demand for throughput and a demand for hardware capacity are grown and the system becomes expensive.

In addition, although an alpha blending technique of making two images transmit by using a generally known alpha channel of the image is conceivable, in a case where two images are simply alpha-blended respectively at 50%, there is such a problem that the contrast is lowered and the luminance and color are thinned to make it difficult to see it.

An object of the present invention is to provide an image processing system and an image processing method that are easy for a user to use by generating a more natural composite image that makes the solid object (the obstacle) easily visible.

Solution to Problem

An image processing system of the present invention, in the image processing system that composites photographed images from a plurality of cameras to generate an overhead view image, includes an image detection unit that extracts image feature amounts from the images of the respective cameras and an image conversion unit that computes blend rates in accordance with the extracted image feature amounts and composites together the overhead view images in a superposition area in which the plurality of camera images overlap, wherein the image conversion unit assesses a correlation between the image feature amounts of the respective images in the aforementioned superposition area and performs composition by switching a blending method in accordance with the strength of the correlation.

The aforementioned image conversion unit, in a case where it has been assessed that the correlation between the respective images in the aforementioned superposition area is weak, assesses whether there exists a portion in which the image feature amounts of the aforementioned respective images locationally overlap and performs composition by switching the blending method in accordance with presence/ absence of the overlapping portion. Then, in a case where it has been assessed that there exists the portion in which the image feature amounts of the aforementioned respective image overlap, it sets the blend rate of the image that is larger in the aforementioned image feature amount as large.

Advantageous Effects of Invention

According to the present invention, there can be provided the image processing system that generates the more natural composite image that makes the solid object (the obstacle) easily visible and is easy for the user to use.

BRIEF DESCRIPTION OF DRAWINGS

FIG. 3 is a diagram showing an example of area division of a photographing region and image composition in a superposition area.

FIG. 5A is a diagram showing a blend rate computing method in S406 in FIG. 4.

FIG. 5B is a diagram showing a blend rate computing method in S406 in FIG. 4.

FIG. 6 is a diagram showing a blend rate setting method in S404 in FIG. 4.

FIG. 7 is a diagram showing another example of the blend rate setting method in S404 in FIG. 4.

FIG. 10 is a diagram showing an example of a composite image in a case where the solid object is present outside the superposition area.

FIG. 11 is a diagram showing an example of a composite image in a case where a pedestrian has moved in the superposition area.

FIG. 14 is a diagram showing area division in a case of compositing images by utilizing vehicle information.

FIG. 15 is a table that degrees of danger of respective areas divided in FIG. 14 have been classified.

FIG. 16 is an operation sequence of image composition in the superposition area utilizing the vehicle information.

FIG. 17 is an overhead view image display example that the degree of danger has been reflected.

FIG. 18 is a diagram explaining that luminance adjustment is performed by dividing a camera image into areas as a third embodiment.

FIG. 19 is a diagram showing a method of matching gradation centroids of luminance histograms.

FIG. 23 is a diagram explaining amount-of-change restriction on the blend rate.

DESCRIPTION OF EMBODIMENTS

In the following, embodiments of the present invention will be described by using the drawings.

First Embodiment

Figure 1:
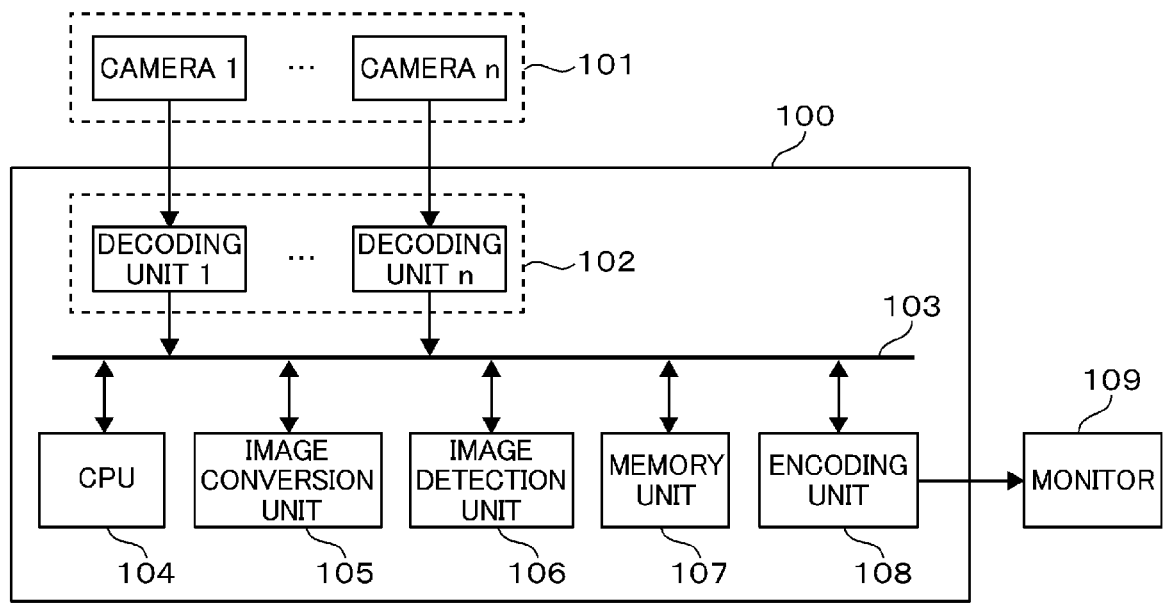
FIG. 1 is a block diagram showing a configuration of an image processing system according to a first embodiment.

FIG. 1 is a block diagram showing a configuration of an image processing system according to a first embodiment. The image processing system is configured such that an image around a vehicle is photographed by a plurality (n units) of cameras 101 loaded on the vehicle, photographed images of the respective cameras are composited together by an image processing device 100, and an overhead view image around the vehicle is displayed by a monitor 109. In the image processing device 100, pieces of photographed image data from the respective cameras 101 are subjected to decode processing by a plurality of respectively corresponding decoding units 102 and are stored in a memory unit 107 via a bus 103.

An image conversion unit 105 performs composition processing on the photographed image data obtained from the respective cameras 101 and stored in the memory unit 107 to generate the overhead view image around the vehicle. That is, it performs lens distortion correction processing and perspective transformation processing on wide-angle camera images, creates overhead view images for every camera, performs trimming, composition, alpha-blending processing on these overhead view images, and performs processing of generating the overhead view image of the entire circumference of the vehicle. An image detection unit 106 performs edge extraction, outlie extraction, Gaussian processing, noise removal processing, threshold value processing and so forth on the photographed image data and performs detection processing for presence/absence of a white line drawn on the road, an obstacle, a pedestrian and so forth and the size of an area over which they are reflected. An encoding unit 108 performs encoding processing on the generated overhead view image and a CPU 104 controls operations of the abovementioned respective units.

The overhead view image data output from the image processing device 100 is displayed by the monitor 109. The monitor 109 is not limited in kind thereof and may be optional such as a CRT (Cathode Ray Tube), an LCD (Liquid Crystal Display), an LCOS (Liquid Crystal On Silicon), an OLED (Organic Light-emitting diode), a holographic optical element, a projector device and so forth. In addition, it may be installed inside or outside the vehicle and an HUD (Head-Up Display), an HMD (Head Mounted Display) and so forth may be utilized not limited to a planar monitor.

The image processing device 100 is of the type that the obstacle and the pedestrian are detected by utilizing the images photographed by the plurality of cameras, the overhead view images of the respective camera images are composited together such that the obstacle and the pedestrian reflected in the image can be easily seen so as to generate the overhead view image of the entire circumference of the vehicle in this way.

Although the image processing system of the present embodiment is so configured as to include the image processing device 100, the plurality of cameras 101 and the monitor 109, it may be configured such that one or both of the cameras 101 and the monitor 108 are connected to the outside of the system as external device(s).

In addition, although in the present embodiment, description is made on generation of the overhead view image around the vehicle, as an application other than the above, it is applicable to a case of compositing together the photographed images from the plurality of cameras to create an overhead view image of a region to be monitored.

Figure 2:
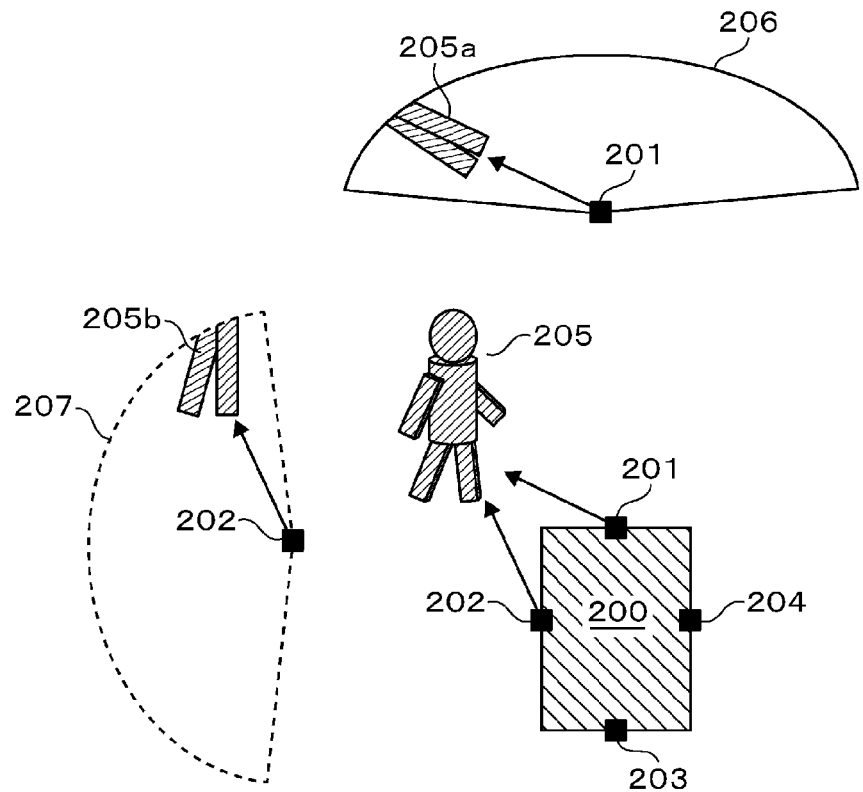
FIG. 2 is an example of an image that the same subject has been photographed by a plurality of cameras installed in a vehicle.

FIG. 2 is an example of an image that the same subject has been photographed by the plurality of cameras installed in the vehicle. A front camera 201, a left-side camera 202, a rear camera 203, a right-side camera 204 are installed in a vehicle 200, and a situation that a pedestrian 205 has been walking toward the diagonally forward left side of the vehicle 200 is shown. 206 is an image that this situation has been photographed by the front camera 201 and 207 is an image that it has been photographed by the left-side camera 202. In the present example, the respective cameras direct diagonally downward and parts 205a, 205b of the legs of the pedestrian 205 are reflected in the images 206, 207.

Since shooting angles are different, the leg 205a that has extended in a direction of an arrow extending from the front camera 201 is photographed in the image 206 photographed by the front camera 201. On the other hand, the leg 205b that has extended in a direction of an arrow extending from the left-side camera 202 is photographed in the image photographed by the left-side camera 202. That is, although they photograph the pedestrian 205 who is the same subject, the legs 205a, 205b oriented in different directions are photographed depending on a difference in photographing position between the cameras. This is a phenomenon that occurs because the pedestrian 205 who is the subject is a solid object. In a case where the subject is not the solid object and is a planar pattern drawn on the road, it is photographed in the images 206 and 207 in the same pattern and they will overlap each other if positions thereof are aligned with each other. That is, in a case where objects that extend in different directions are detected in two images when the same subject is being photographed from different directions, it can be assessed that the solid object is present. In the present embodiment, blending processing has been performed such that the overlapping portion of the plurality of camera images can be more easily seen by utilizing this feature.

FIG. 3 is a diagram showing an example of area division of a photographing region and image composition of the superposition area. The surrounding of the vehicle 200 is divided into eight areas 300 to 307. The areas photographed by the camera 201 are 300, 301, 302 and the areas photographed by the camera 202 are 300, 303, 305. Other areas are determined relative to the cameras 203, 204 similarly.

First, correction processing for lens distortion which would occur on an image end and perspective transformation for changing a rate of magnification according to a depth distance are performed on the photographed images. Thereby, an overhead view image that ranges the respective areas 300, 301, 302 in FIG. 3 is created from, for example, the image 206 in FIG. 2. Likewise, an overhead view image that ranges the respective areas 300, 303, 305 in FIG. 3 is created from the image 207 in FIG. 2.

In this case, the area 300 is an area that the images of the camera 202 and the camera 202 overlap each other and hereinafter will be called a "superposition area". The other areas 302, 305, 307 are also superposition areas that two camera images overlap each other. If the ground is flat with no projection (a solid object), the images in the same area are the same as each other and will overlap each other. That is, the superposition area means an area that the same position on the ground is photographed when the overhead view image has been created from the plurality of camera images.

In a case where the image in the superposition is to be displayed, a method of displaying it by selecting one of the two images and a method of displaying it by blending and compositing together both of them are possible. On that occasion, when in a case where the solid object is present in the superposition area, if only one image is selected and displayed, it is feared that the image may be cut off in the vicinity of the joint of the composite image and a not-reflected portion (image missing) may be generated. Accordingly, in a case where the solid object (the pedestrian) is present in the superposition area 300, display has been made by performing blending processing on the legs 205a, 205b of the pedestrian who is the solid object as shown in FIG. 3. Thereby, partial missing of the image of the solid object can be avoided.

Figure 4:
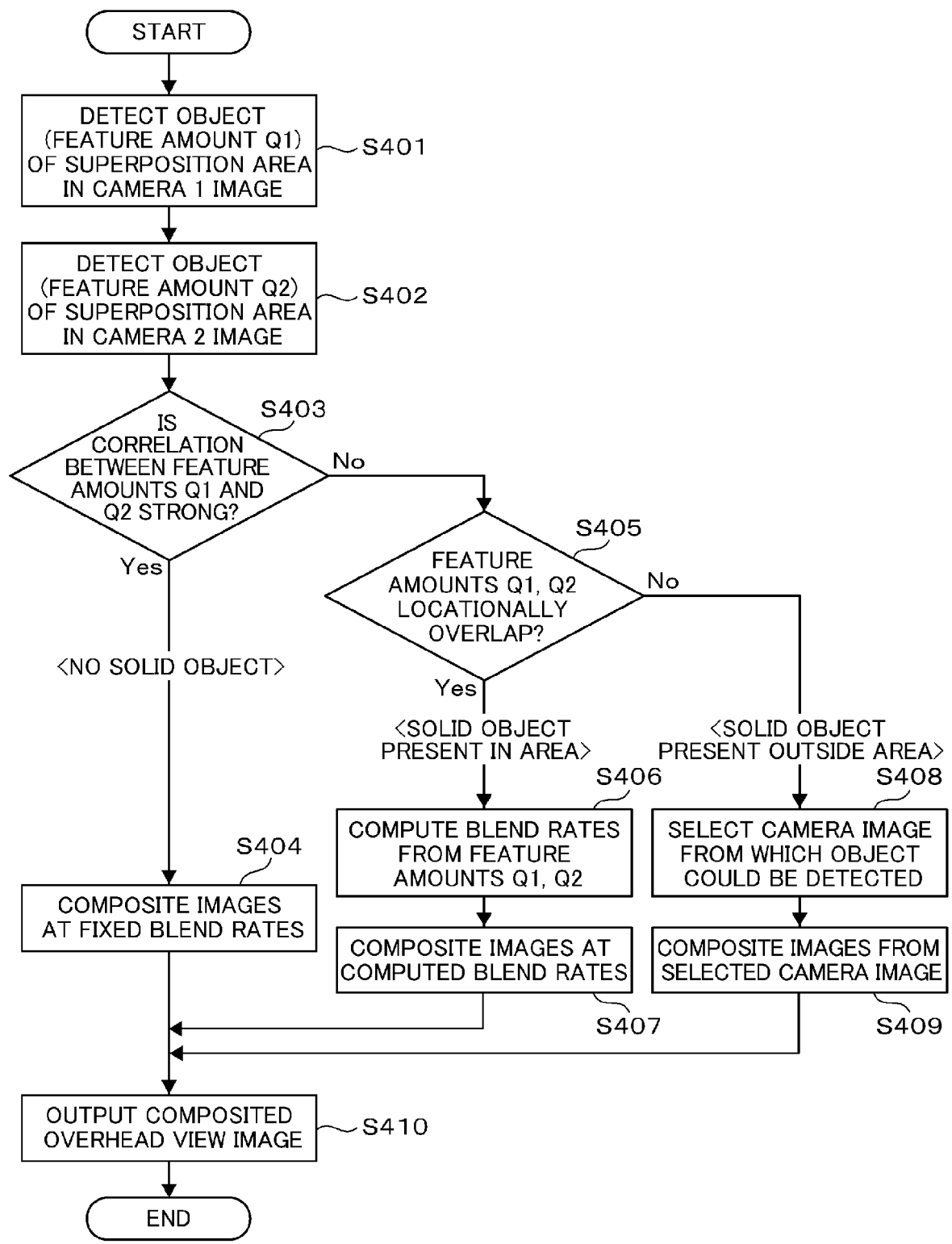
FIG. 4 is an operation sequence of the image composition in the superposition area.

FIG. 4 is an operation sequence of image composition in the superposition area. As an example, a case of compositing together the images in the superposition area 300 of a camera 1 (201) and a camera 2 (202) is assumed.

In S401, a feature amount of the photographed image in the superposition area in a camera 1 image is extracted by the image detection unit 106 to detect an object that is present there. On that occasion, the image feature amount is extracted by outline extraction by a portion with many edges and so forth and a Laplacian filter, a Sobel filter and so forth, banalization processing, color information, histogram information and various pattern recognition processing and so forth. Then, an image feature amount Q1 such as the position of the pixel from which the edge and the outline could be extracted and the magnitude of the luminance of that edge is stored in the memory unit 107. As the feature amount, a feature amount of the image by SIFT (Scale-Invariant Feature Transform), HOG (Histograms of Oriented Gradients) and so forth may also be utilized. In addition, the HOG feature amount and the feature amount of the shape of the pedestrian may be combined together so as to sort whether feature information that could be extracted is on the pedestrian or a substance. Then, information that is easier to use can be afforded to the user (a driver) by switching contrast enhancement processing and a way of displaying the degree of danger and so forth depending on whether it is the pedestrian or the substance.

In S402, likewise, the object that is present there is detected from the feature amount of the photographed image in the superposition area in the camera 2 image and an image feature amount Q2 that has been extracted is stored in the memory unit 107.

In S403, strength of correlations between the positions of pixels and between the feature amounts Q1, Q2 extracted in S401, S402 is assessed. That is, whether the pixel positions of the detected object align with each other or are gathered within a certain range and whether a difference between the feature amounts is within a certain range are assessed by computation. This is, correlations in special distance relation and semantic distance relation are assessed by performing statistical processing and clustering processing.

In a case where it has been assessed that the correlation is strong (Yes) in S403, it is decided that the solid object is not present and it proceeds to S404. In S404, the images of the camera 1 and the camera 2 are composited together at a certain fixed blend rate. In this case, although it is also possible to select and utilize the image of either the camera 1 or the camera 2, if the solid object has been present in the vicinity of the joint, it would be feared that the image thereof may be missed. Thus, adoption of a blending system is preferable. The overhead view image composited in S404 is output to the monitor 109 in S410.

In a case where it has been assessed that the correlation is weak (No) in S403, it proceeds to S405 regarding that there is the possibility that the solid object may be present in the superposition area. In S405, whether there exist locationally overlapping portions in the image feature amounts Q1, Q2 of the camera 1 and the camera 2 is assessed.

In a case where it has been assessed that there exist the locationally overlapping portions in the image feature amounts (Yes) in S405, it means that the solid object itself is present in the superposition area (described in FIG. 9 later) and it proceeds to S406. In S406, the blend rates are computed in accordance with the values Q1, Q2 of the feature amounts that can be extracted from the respective cameras. In S407, composition of the images in the superposition area is performed at the blend rates computed in S406 and the overhead view image is output to the monitor 109 in S410.

In a case where it has been assessed that there are no locationally overlapping portions in the image feature amounts (No) in S405, it means that the solid object is not present in the superposition area itself and the solid object that is present around it is reflected in the camera image on the side that the feature could be extracted (the object could be detected) (later described in FIG. 10) and it proceeds to S408. In S408, the camera image on the side that the feature could be extracted (the object could be detected) is selected. In S409, the overhead view images are composited from the camera images selected in S408 and output to the monitor 109 in S410. Also in this case, in order to avoid missing of the image in the vicinity of the joint due to erroneous detection, the overhead view images may be composited by performing blending processing, giving priority to the blend rate of the camera image that the feature could be extracted.

In the abovementioned operation sequence, the planar pattern drawn on the road can be discriminated from the solid object by extracting the image feature amounts of the camera images photographed from different directions in the superposition area photographed by the plurality of cameras and assessing the correlation between them. In addition, in a case where the solid object is present, locational overlapping of the feature amounts is assessed and whether the solid object is present in the superposition area or present outside the superposition area can be discriminated. Then, the favorable overhead view image can be obtained by changing the blend rates when compositing the overhead view image, conforming to each state.

FIG. 5A, FIG. 5B, FIG. 5C and FIG. 5D are diagrams showing methods of computing the blend rates in S406 in FIG. 4. The blend rates at which the respective camera images are to be composited together are computed on the basis of the featured amounts Q1, Q2 of the superposition area photographed by the camera 1 and the camera 2. The horizontal axis takes a ratio between the feature amounts of the respective camera images detected by the image detection unit 106 and the vertical axis indicates blend rates P1, P2 of the respective camera images. The ratio between the feature amounts of the camera images is obtained in the following manner. First, a result of a predetermined arithmetic operation performed on the feature amount Q1 of the camera 1 image is defined as F (Q1). A result of the predetermined arithmetic operation performed on the feature amount Q2 of the same camera 2 image is defined as F (Q2). The ratio of the feature amount of the camera 1 image is computed as F (Q1)/(F (Q1)+F (Q2)). Likewise, the ratio of the feature amount of the camera 2 image is computed as F (Q2)/(F (Q1)+F (Q2)). A predetermined arithmetic operation F will be described in detail in the following description of FIG. 5A.

In the case in FIG. 5A, a computation formula for the blend rates is plotted as a graph of a slope 1 relative to the ratio between the feature amounts. Therefore, the blend rate P1 of the camera 1 image and the blend rate P2 of the camera 2 image are obtained by $$P1 = F(Q1)/(F(Q1)+F(Q2))$$

$$P2 = F(Q2)/(F(Q1)+F(Q2)).$$

Here, various arithmetic operations are possible as for the predetermined arithmetic operation F. In the example in FIG. 5A, a case where the value of the result of arithmetic operation is increased for the image that is high in possibility of presence of the solid object will be described. For example, an arithmetic operation for counting the number of pixels having the image feature amounts that are at least a predetermined threshold value in the superposition area is performed. In this case, the size that the image of the solid object occupies in each superposition area of the camera 1 image or the camera 2 image can be set as an element that makes the blend rates variable. In addition, arithmetic operations for computing a sum total, an average, a weighted average, a centroid, a central value of the image feature amounts of pixels in the superposition area of the camera 1 image or the camera 2 image are also possible. In this case, not only the size of the image of the solid object that occupies in the superposition area but also the magnitude of the value of the feature amount can be set as the element that makes the blend rates variable. Or, it is also possible to determine the blend rates for every pixel. In this case, Q1 itself of a target pixel may be used as F (Q1) and Q2 itself of the target pixel may be used as F (Q2). In the case in FIG. 5A, F (Q1) is compared with F (Q2) and the blend rate of the image that is larger in value thereof will be set large.

The case in FIG. 5B is also an example that the result F (Q1) of the predetermined arithmetic operation performed on the feature amount Q1 of the camera 1 image and the result F (Q2) of the predetermined arithmetic operation performed on the feature amount Q2 of the camera 2 image are used to compute the blend rate P1 of the camera 1 image and the blend rate P2 of the camera 2 image similarly to FIG. 5A. Although FIG. 5B is the one that makes the blend rate—feature amount ratio continuously change similarly to FIG. 5A, it is the one that the slope of a change in blend rate has been made larger than that in FIG. 5A on a portion in which the "ratio between the feature amounts" is close to 0.5. By such a blend rate computing method, it becomes possible to emphasize the contrast of a more characteristic image (an image that is high in possibility that the solid object is present) in spite of gentle switching of the blend rate when the "ratio between the feature amounts" is changed. Thereby, there is such an effect that it becomes possible for the user to more easily recognize the image that is comparatively high in possibility that the solid object is present.

Figure 5C:
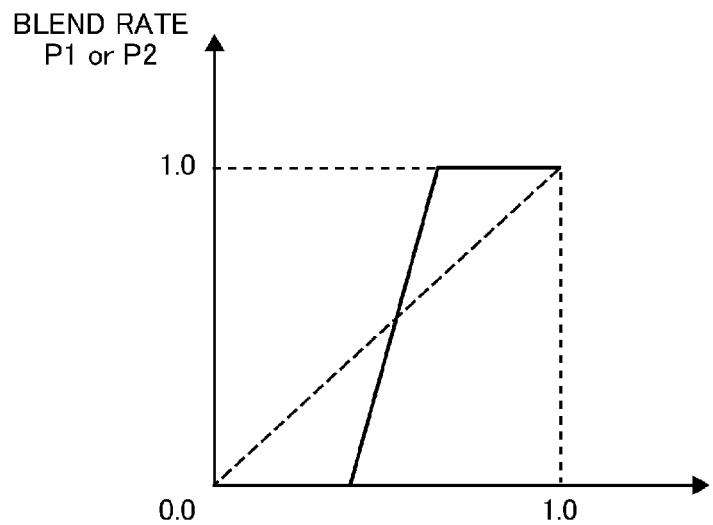
FIG. 5C is a diagram showing a blend rate computing method in S406 in FIG. 4.

In addition, also the case in FIG. 5C is an example that the result F (Q1) of the predetermined arithmetic operation performed on the feature amount Q1 of the camera 1 image and the result F (Q2) of the predetermined arithmetic operation performed on the feature amount Q2 of the camera 2 image are used to compute the blend rate P1 of the camera 1 image and the blend rate P2 of the camera 2 image similarly in FIG. 5A. FIG. 5C is also the one that makes the blend rate—feature amount ratio continuously change. However, in FIG. 5C, in a case where the "ratio between the feature amounts" has become equal to or more than a predetermined magnitude, the blend rate of the image of that camera is set to 1 and in a case where the "ratio between the feature amounts" has become equal to or less than the predetermined magnitude, the blend rate of the image of that camera is set to 0. By such a blend rate computing method, it becomes possible to further emphasize the contrast of the more characteristic image (the image that is high in possibility that the solid object is present) in spite of gentle switching of the blend rate when the "rate between the feature amounts" is changed. There is such an effect that it becomes possible for the user to more easily recognize the image that is high in possibility that the solid object is present.

Incidentally, although linear graphs have been utilized in FIG. 5B and FIG. 5C, more easily visible display can be made if a LOG-curve graph that has been made to conform to visual characteristics is utilized.

Figure 5D:
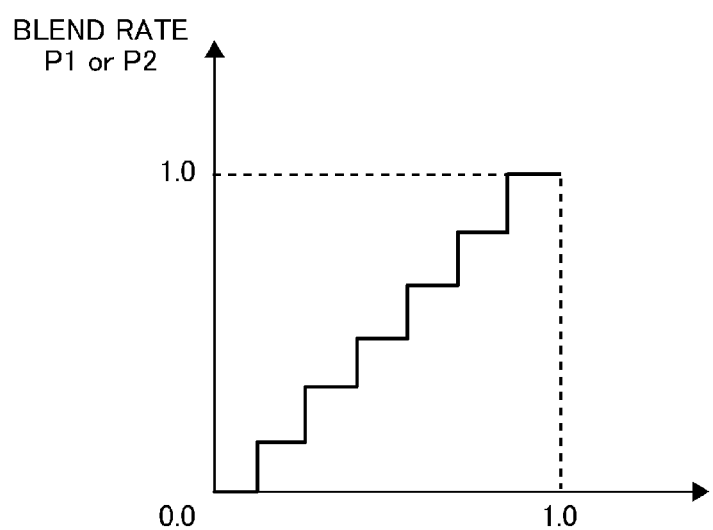
FIG. 5D is a diagram showing a blend rate computing method in S406 in FIG. 4.

In addition, FIG. 5D is a case where has been set such that the blend rate is stepwise switched when the "ratio between the feature amounts" is changed. In this case, as the number of switching steps is increased, switching of the blend rate becomes gentle. In the example in FIG. 5D, although it is similar to a polygonal line that the straight line in FIG. 5A has been stepwise changed, it will be also possible to make it have characteristics of the polygonal line similar to the polygonal line in FIG. 5B and the polygonal line similar to the polygonal line in FIG. 5C if a difference is made in the amount of change in blend rate at each switching. As described above, even when a change in blend rate relative to a change in the "ratio between the feature amounts" is discontinuous as in stepwise switching of the blend rate according to a change in "ratio between the feature amounts", it would constitute one aspect of the present invention.

Incidentally, although in any of FIG. 5A, FIG. 5B, FIG. 5C, FIG. 5D, a case where the value of the arithmetic operation result becomes large for the image that is high in possibility that the solid object is present has been described, it may be the arithmetic operation F that the value of the arithmetic operation result becomes smaller for an image that is higher in possibility that the solid object is present. In this case, it is enough to simply appropriately change the graphs in FIG. 5A, FIG. 5B, FIG. 5C, FIG. 5D from the ones rising to the right to the ones rising to the left and also in this case it would constitute one aspect of the present invention.

Like this, in the examples in FIG. 5A, FIG. 5B, FIG. 5C, FIG. 5D, unlike the technique disclosed in Patent Literature 4, also for the image of the portion of the solid object, the blend rates can take many values other than 1 and 0. Thereby, it becomes possible to more naturally composite together the portions of the solid object in accordance with the grade of possibility that the solid object is present.

In addition, the blend rates are computed for the whole superposition area or in units of pixels and are used in composition processing performed for the whole superposition area or in units of pixels. Thus, in the superposition area, generation of the unnatural joined portion of the images such as the boundary line disclosed in Patent Literature 3 and Patent Literature 4 can be prevented and it becomes possible to generate the more natural composite image.

FIG. 6 is a diagram showing a blend rate setting method in S404 in FIG. 4. This is a technique of performing composition by setting certain fixed blend rates for every pixel for the purpose of preventing missing of the object in the vicinity of the joint due to erroneous detection by the image detection unit 106. Therefore, it is also applicable to the process in S409.

In FIG. 6, description will be made by giving the left front diagonal superposition area 300 by way of example. The superposition area 300 is divided in a fan-like fashion and the blend rate P1 of the image of the front camera 201 and the blend rate of the blend rate P2 of the image of the left-side camera 202 are fixedly set for each of divided areas a1 to a7. For example, in the area a1, since it is the closest to the front camera 201 side, the blend rate of the camera 201 is set as P1=0.9, the blend rate of the camera 202 is set as P2=0.1. P1=0.8, P2=0.2 are set in the area a2 adjacent thereto. On the contrary, in the area a7, since it is the closest to the left-side camera 202 side, P1=0.1, P2=0.9 are set. The blend rates are set by giving priority to the image of the camera 201 as it is closer to the camera 201 and giving priority to the image of the camera 202 as it is closer to the camera 202 in this way. Thereby, since the image from the camera that is closer to the camera is emphatically blended in each divided area, a more easily visible image can be created. Further, in each divided area, the blend rates may be adjusted in accordance with the feature amount of each camera image.

FIG. 7 is a diagram showing another example of the blend rate setting method in S404 in FIG. 4. Distances from a pixel position C in the superposition area 300 to the camera 201 and the camera 202 installed in the vehicle 200 are set as d1, d2. Then, the fixed blend rates are set in accordance with a ratio between the distances d1, d2. That is, at a pixel position (that is, d1<d2) located at a distance close to the camera 201, the blend rate of the image of the camera 201 is set high. For example, the blend rate P1 of the image of the camera 201 and the blend rate P2 of the image of the camera 202 are given by $$P1=d2/(d1+d2)$$

$$P2=d1/(d1+d2).$$

However, since the possibility that defocusing and distortion may be increased is high at a position that is too close to the camera, it is preferable to correct the blend rates so as to give priority to a camera that is more remote in distance. That is, when an approach limit threshold value has been designated by dth (however, d1 minimum value≤dth≤d1 maximum value), the blend rate P1 of the close camera 201 image is corrected to be lowered at a position where d1<d2 and d1<dth are established.

For example, by replacing the abovementioned set blend rates P1, P2 with each other, they are given as $$P1=d1/(d1+d2)$$

$$P2=d2/(d1+d2).$$

Thereby, there is such an effect that it is displayed with defocusing and distortion that would occur at a position that is too close from the camera reduced.

Figure 8:
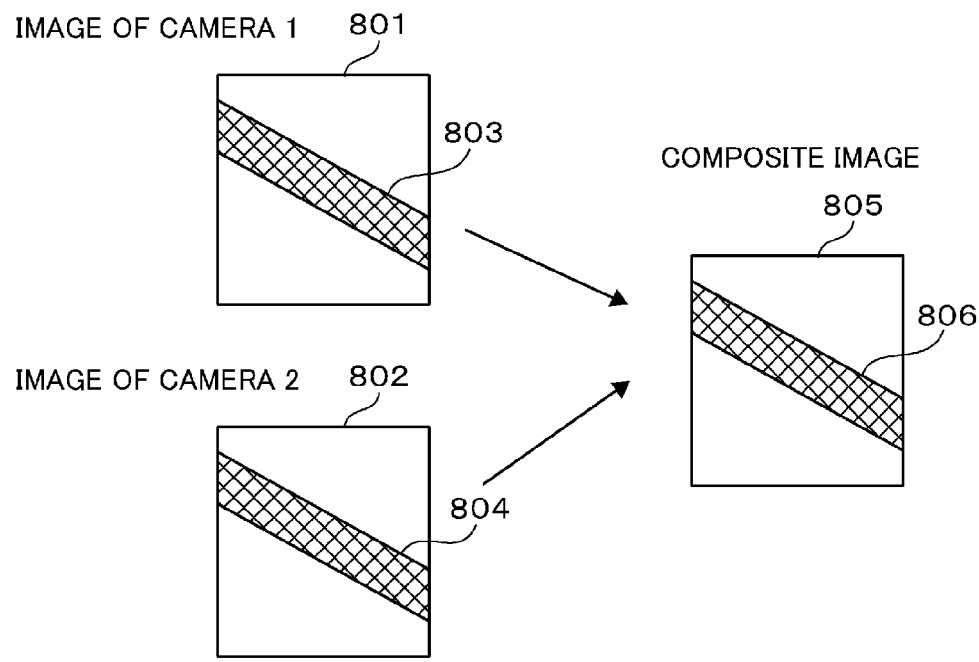
FIG. 8 is a diagram showing an example of a composite image in a case where a solid object is not present in the superposition area.

FIG. 8 is a diagram showing an example of a composite image when the solid object is not present in the superposition area. It is the case where the correlation between the image feature amounts of the two camera images is strong in assessment in S403 in FIG. 4. In the superposition area of the camera 1 and the camera 2, a white line 803 that is planarly drawn on the road, a parking lot or the like photographed by the camera 1 is reflected in an image 801 of the camera 1. A white line 804 that is drawn on the road, the parking lot or the like photographed by the camera 2 is reflected in an image 802 of the camera 2. Since the same superposition area is photographed, the same image is generated unless the solid object is present in that area. In this case, the process in S404 is performed to composite together the images 801, 802 from the two cameras at the fixed blend rates or to composite the overhead view images by selecting one image. As a result, a composite image 805 in which one white line 806 has been reflected is generated.

Figure 9:
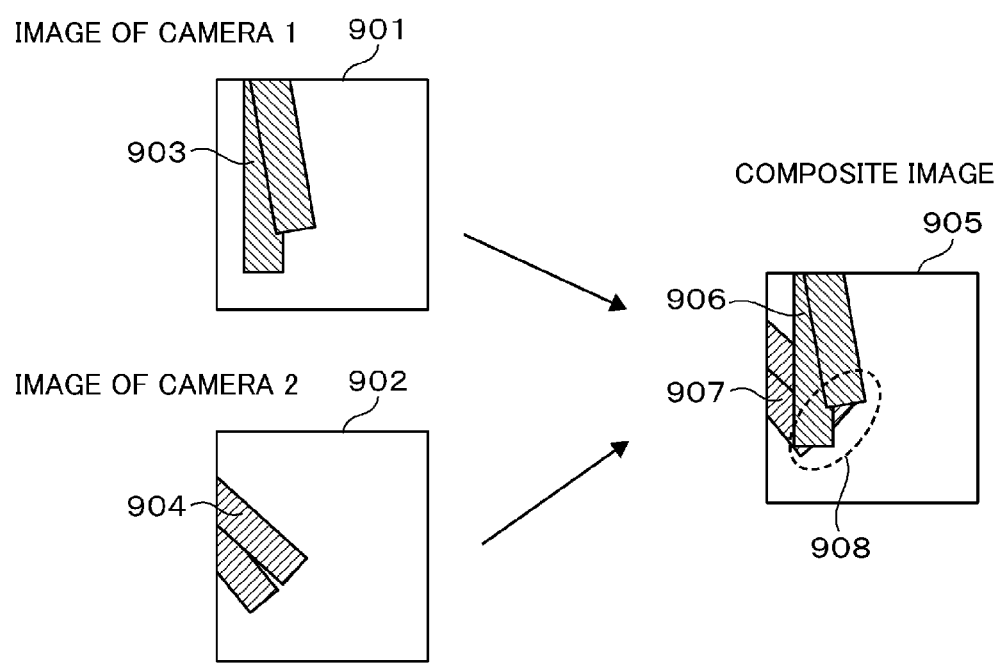
FIG. 9 is a diagram showing an example of a composite image in a case where the solid objet is present in the superposition area.

FIG. 9 is a diagram showing an example of a composite image in a case where the solid object is present in the superposition area. It is the case where the correlation between the image feature amounts of the two camera images is weak in assessment in S403 in FIG. 4. In the superposition area of the camera 1 and the camera 2, a leg 903 of a pedestrian that has been photographed by the camera 1 is reflected in an image 901 of the camera 1. A leg 904 of the pedestrian that has been photographed by the camera 2 is reflected in an image 902 of the camera 2. Although the same superposition area is photographed, since the pedestrian who is the solid object is present in that area, the legs 903, 904 of the pedestrian extend in different directions.

Further, since in assessment in S405 in FIG. 4, a locationally overlapping portion 908 is present in the image feature amounts of both of them, the solid object is present in the superposition area. In this case, the process in S406 is performed to compute the blend rates of the image 901 of the camera 1 and the image 902 of the camera 2 and, in S407, the images are composited together at the blend rates. As a result, an image 905 that the legs 906, 907 of the pedestrian have been composited together in accordance with the respective blend rates is generated.

FIG. 10 is a diagram showing an example of a composite image in a case where the solid object is present outside the superposition area. It is the case where the correlation between the image feature amounts of the two camera images is weak in assessment in S403 in FIG. 4. In the superposition area of the camera 1 and the camera 2, a leg 1003 of a pedestrian that has been photographed by the camera 1 is reflected in an image 1001 of the camera 1. Although an image photographed by the camera 2 is reflected in an image 1002 of the camera 2, nothing corresponding to the leg of the pedestrian is present. It means that although nothing is present in the superposition area, the pedestrian (the solid object) is present near the camera 1 and has been reflected in the image 1001 of the camera 1 as the object 1003. On the other hand, since nothing is present in the vicinity of the image 1002 of the camera 2, nothing is reflected.

Further, since in assessment in S405 in FIG. 4, the locationally overlapping portion is not present in the image feature amounts of both of them, it is decided that the solid object is present outside the superposition area. In this case, the process in S408 is performed to select the image 1001 of the camera 1 that the object 1003 is reflected, in S409, images are composited together by giving priority to the image 1001 of the camera 1. As a result, a composite image 1004 that a leg 1005 of the pedestrian that has been photographed by the camera 1 is present is generated.

FIG. 11 is a diagram showing an example of a composite image in a case where a pedestrian has moved in the superposition area. In a case where the pedestrian is moving from the left side in a right direction on a place in a superposition area 1100 of the camera 1 and the camera 2, composite images of the pedestrian in the superposition area 1100 are arrayed in time series. In image composition, the blend rates are set in accordance with the image feature amounts following S406 in FIG. 4.

At a time t1, although a leg 1101 of the pedestrian that has been photographed by the camera 1 and a leg 1102 of the pedestrian that has been photographed by the camera 2 are composited together, the blend rates thereof are determined in accordance with the image feature amounts (for example, areas that the legs are reflected) and they are composited at P1=0.8 for the camera 1 side one and P2=0.2 for the camera 2 side one. By setting the blend rates in this way, the side that the area of the leg of the pedestrian is reflected large, that is, the leg 1101 that has been photographed by the camera 1 is clearly displayed.

At a time t2, the image feature amounts (the areas) of a leg 1103 that has been photographed by the camera 1 and a leg 1104 that has been photographed by the camera 2 become the same and the blend rates thereof are equal and they are composited together at P1=P2=0.5.

At a time t3, the image feature amount of a leg 1106 that has been photographed by the camera 2 becomes slightly larger than that of a leg 1105 that has been photographed by the camera 1 and they are composited together at the blend rates of P1=0.3 for the camera 1 side one and P2=0.7 for the camera 2 side one.

At a time t4, the image feature amount of a leg 1108 that has been photographed by the camera 2 becomes greatly larger than that of a leg 1107 that has been photographed by the camera 1 and they are composited together at the blend rates of P1=0.1 for the camera 1 side one and P2=0.9 for the camera 2 side one. As a result, the leg 1108 that has been photographed by the camera 2 that the area of the leg is reflected larger is clearly displayed.

When the same object is photographed by the two cameras in this way, the image that the contrast of the image the area of which is reflected larger has been increased can be generated by setting the blend rates in accordance with the relative ratio between the image feature amounts.

In the abovementioned example, since the image feature amounts become the same as each other at the time t2, the blend rates have been set equally as P1=P2=0.5. However, in this case, there is the possibility that the luminances of both of them may be thinned and visual confirmation may become difficult. Thus, taking a hysteresis into account, a process of preferentially displaying the image that has been high in blend rate immediately before may be performed. Specifically, in the example in FIG. 11, at the time t1 that is immediately before the time t2, P1 is larger in blend rate. Thus, in the process at the time t2 that the image feature amounts are the same as each other, a process of adding or multiplying a predetermined ratio or value to/into the detected image feature amount is performed by giving priority to P1. Thereby, the projected image of the camera 1 may be made easily visible by setting the blend rates as, for example, P1=0.6, P2=0.4 and so forth. Incidentally, on this occasion, they may also be set as P1=0.4, P2=0.6, anticipating the movement at the next time from the previous movement. In a case where the image feature amounts of the same level have been detected in the camera 1 and the camera 2 as in this technique, a phenomenon that the both images fade out and visual confirmation thereof becomes difficult can be reduced by blending them so as to avoid a situation that the blend rates of the two projected images become equal (P1=P2=0.5) in accordance with a time-series change in feature amount.

Figure 12:
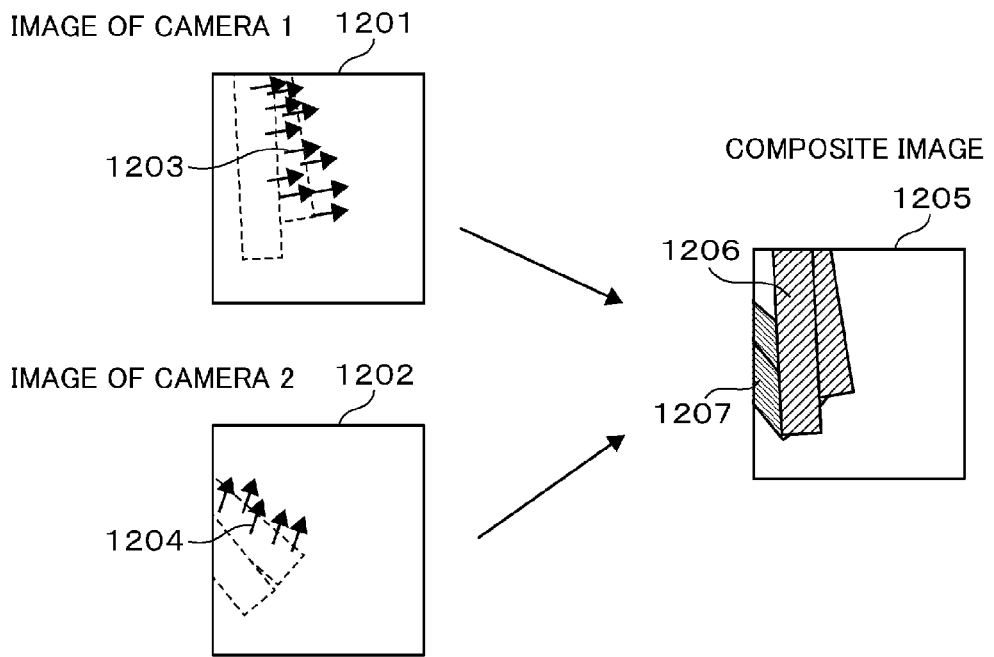
FIG. 12 is a diagram explaining a method of computing the blend rate by using motion vector information.

FIG. 12 is a diagram explaining a method of computing the blend rates by using motion vector information. That is, in S401, S402 in FIG. 4, motion vector information on optical flow is utilized for detection of the image feature amounts and the blend rates in the superposition area are computed therefrom to composite images. Motion vectors of a plurality of frames are utilized as the image feature amounts and the blend rates are computed from a ratio between sum totals of the motion vectors.

Specifically, a sum total ΣCam1 of motion vectors 1203 in an image 1201 of the camera 1 and a sum total ΣCam2 of motion vectors 1204 in an image 1202 of the camera 2 are computed. From them, the blend rate P1 of the camera 1 and the blend rate P2 of the camera 2 are computed as $$P1=\Sigma Cam1/(\Sigma Cam1+\Sigma Cam2)$$

$$P2=\Sigma Cam2/(\Sigma Cam1+\Sigma Cam2).$$

That is, the blend rate of the camera image that is larger in motion is set larger. A composite image 1205 that includes moving objects 1206, 1207 is generated at these blend rates. According to this technique, it becomes possible to generate the image that is made clearer and more improved in contrast for the one that is larger than others in movement in the superposition area.

Second Embodiment

Figure 13:
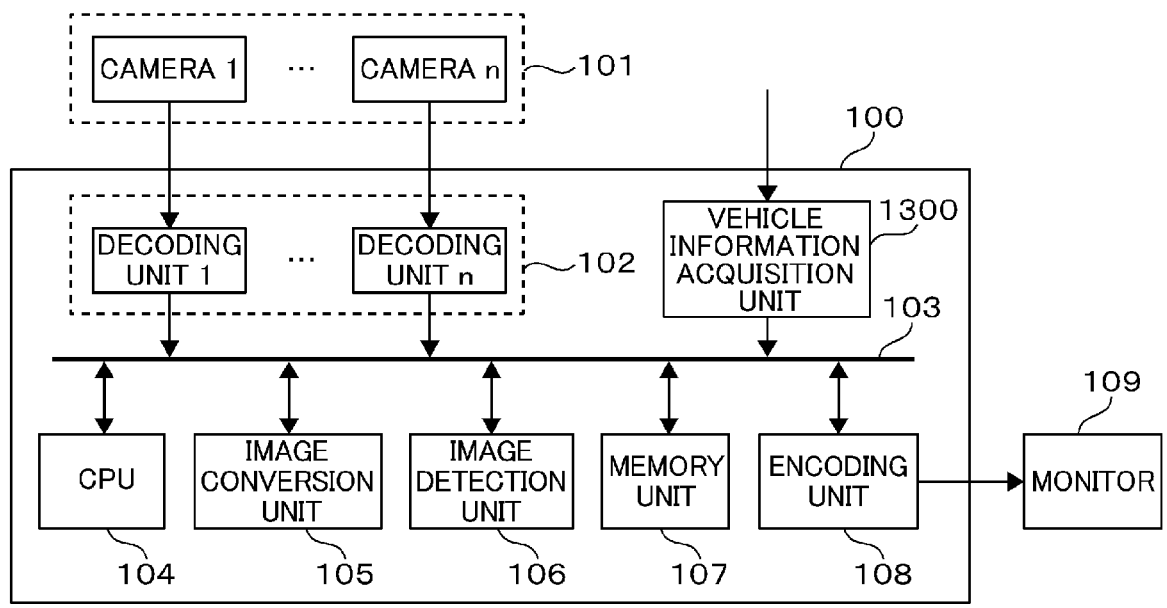
FIG. 13 is a block diagram showing a configuration of an image processing system according to a second embodiment.

FIG. 13 is a block diagram showing a configuration of an image processing system according to a second embodiment. In the second embodiment, a vehicle information acquisition unit 1300 is added to the configuration of the first embodiment (FIG. 1). The vehicle information acquisition unit 1300 acquires vehicle control information from a vehicle to which the image processing system concerned is applied via a CAN (Controller Area Network), FlexRay and so forth. The vehicle control information is information on direction of movement, angle of steering wheel and vehicle speed of the vehicle, headlights and hazard lamps, On/Off of wipers, orientations of direction indicators and so forth, and the image processing system performs image processing that takes the degree of danger into account by utilizing these pieces of vehicle information.

FIG. 14 is a diagram showing area division in a case of performing image composition by utilizing the vehicle information. In particular, in a case of performing image composition in the superposition area, area division is performed in accordance with the degree of danger. Here, the superposition areas 300, 301, 302, 305, 307 are divided into four depending on the degree of danger and the superposition area 300 is divided into A1 to A4, the superposition area 302 is divided into B1 to B4, the superposition area 303 is divided into C1 to C4, the superposition area 304 is divided into D1 to D4.

FIG. 15 is a table that the degrees of danger of the respective areas that have been divided in FIG. 14 have been classified. The degrees of danger of the respective divided areas are indicated by (large), (medium), (small) using the vehicle information (the direction of movement, the orientation of the steering wheel, the speed) as parameters. In each divided area, composition and display of images are changed in accordance with the degree of danger.

In classification of the degrees of danger in the present embodiment, two speed threshold values are used. A first threshold value X is larger than a second threshold value S. In a case where the speed of the vehicle is at least the first threshold value X, it is decided that it is the dangerous speed as the speed for a parking operation. In this case, it is possible to give a driver a warning more by displaying all of the areas around the vehicle as dangerous areas. In a case where the vehicle speed is smaller than the first threshold value X, classification of the degrees of danger of the respective areas is performed using FIG. 15.

For example, in a case where the driver intends to go forward by turning the steering wheel to the left, when a speed V is larger than the second threshold value S (V>S), the left front areas A1 to A4 are set to the degree of danger (large). On the right front side, since there is the possibility that pedestrians who are in the areas B1, B3 may rush out leftward, the degree of danger (medium) is set, and since in the rear areas C2, D1, entanglement and collision may occur due to the structure of the vehicle, the degree of danger (medium) is set. Since other areas B2, B4, C1, D2 are remote in distance, the degree of danger (small) is set. Classification of the degrees of danger is performed conforming to the vehicle information in this way. These are different depending on the type of each vehicle such as the body shape of the vehicle, the small turning range, the initial speed and so forth, and these are set in accordance with each vehicle. There can be provided the display method that is more easily visible for the driver by performing composition by using danger degree information on the respective areas, when it is intended to composite the overhead view images and when it is intended to make the obstacle more easily visible.

As further utilization of the vehicle information, setting as follows is possible. In a case where the own vehicle is at a standstill with the hazard lamps turned On, the degrees of danger of the areas C2, C4, D1, D3 and so forth are set higher on the watch for a vehicle that is approaching from behind. In a case where the driver has made the direction indicator valid, the degrees of danger of the area located in the direction of movement of the direction of the direction indicator and the area behind it are set higher. When the headlights are On, the degree of danger of the area in the direction of movement is set higher. A way of display may be changed depending on whether the lights are directed upward or downward in a state that the headlights are On. For example, when the lights are directed upward, since it is traveling in a darker place and the field of view is narrow, not only the degree of danger on the front is set higher but also the degrees of danger of the left and right areas attention of the driver to which is liable to distract are set higher. In a case where the wipers have been turned On, since there is the possibility that the field of view may be worsened, the degree of danger of the area in the direction of movement is set higher.

FIG. 16 is an operation sequence of image composition in the superposition area utilizing the vehicle information. The procedure of creating the overhead view images is based on the operation sequence in FIG. 4 and processes that have been added will be described.

In S1601, reading of the vehicle information and the danger degree information in FIG. 15 is performed.

In S1601, the vehicle speed V is compared with the threshold value X. In a case where the vehicle speed is larger than the first threshold value X, it proceeds to S1603 and all of the areas are reset to the dangerous areas (large) on the basis of the danger degree information read out from FIG. 15. Thereby, that all of the areas are dangerous is displayed.

In S1604, the composited overhead view image is output in combination with a display system that corresponds to the degree of danger for every display area on the basis of the danger degree information in FIG. 15 or the danger degree information that has been written again in S1603. On that occasion, since the blend rate of the area that the solid object is present is set larger than others, the possibility of presence of the solid object (the obstacle) can be discriminated by confirming the blend rates of the respective camera images in the superposition area. That is, in the superposition area that is large in degree of danger and large in blend rate, it can be decided that it is higher in danger.

FIG. 17 is an overhead view image display example that the degrees of danger have been reflected. In S1604 in FIG. 16, the image conversion unit 105 changes the blend rates in accordance with the feature amount of a solid object (an obstacle) 1700 detected in the superposition area 300 so as to display the obstacle by improving its contrast. Further, in regard to areas 1701-1704 the degrees of danger of which have been set large from the danger degree information in FIG. 15 or the danger degree information that has been written again in S1603, processes of painting out the areas and coloring the edges thereof are performed. When painting out each area, the visual contrast is improved by using a color of a hue that is different from extracted color information with reference to color information in the image feature amounts extracted in S401 and S402 in FIG. 4. In addition, after a colored layer has been superposed on the camera image that is small in blend rate, if the camera image that is large in blend rate is superposed thereon, composition can be performed without lowering so much the contrast of the camera image in which the obstacle may be reflected.

Further, in regard to the area that is high in danger, that is, the superposition area that is large in blend rate and also large in degree of danger, the image conversion unit 105 performs image processing of emphasizing the edge of the object and emphasizing its contrast so as to display it such that the object becomes more conspicuous and can be clearly recognized. In regard to image characteristic parts such as the edge and the outline and so forth extracted in S401, S402, the danger can be more emphasized by performing processing of painting out them with conspicuous colors or of fringing them. In addition, as another way of utilizing this danger degree information, additional information using characters may be displayed in an area that is low in degree of danger and an area for which the degree of danger is not set in FIG. 15.

Third Embodiment

Even though the blend rates are adjusted in the superposition area as described in the aforementioned embodiments 1, 2, when the brightnesses of the respective cameras are greatly different from each another, there are cases where a camera image that is high in luminance is preferentially composited so as to be easily visible and the intended effect cannot be obtained. In addition, when blending processing of the images is performed in a rectangular superposition area, there are cases where a boundary portion between the rectangles becomes conspicuous as a break depending on the blend rates. Further, a difference in feeling to the luminance contrast occurs depending on the age of the driver. Thus, in an third embodiment, a technique of correcting the luminances of the plurality of cameras and methods of correcting the boundary portion between the superposition areas and adjusting the contrast are shown.

FIG. 18 is a diagram explaining that luminance adjustment is performed by dividing the camera image into areas. On that occasion, the image detection unit 106 performs luminance histogram computation and gradation centroid computation as the image feature amounts, the image conversion unit 105 performs image quality adjustment processing such as gradation adjustment and so forth in accordance with a result of detection.

The overhead view images of the cameras 201, 202, 203, 204 that have been installed in the vehicle 200 are respectively divided into three portions, are divided into partial images E1 to E3 for the camera 201, partial images F1 to F3 for the camera 202, partial images G1 to G3 for the camera 203, and partial images H1 to H3 for the camera 204. Among them, the partial image E1 of the camera 201 and the partial image F1 of the camera 202 correspond to a superposition area 1800. Likewise, the partial image E3 of the camera 201 and the partial image H1 of the camera 204 correspond to a superposition area 1801, the partial image F3 of the camera 202 and the partial image G1 of the camera 203 correspond to a superposition area 1802, and the partial image G3 of the camera 203 and the partial image H3 of the camera 204 correspond to a superposition area 1803. In addition, luminance histograms of the partial image E1 and the partial image F1 in the superposition area 1800 are respectively designated by 1811, 1812.

Here, when the same area is to be photographed by different cameras, a difference in luminance occurs in some cases. For example, when the sun is present in the right-side direction (the camera 204 side) of the vehicle 200, the shadow of the vehicle is photographed by the opposite side camera 202 and the partial image F2 becomes darker than other images. In addition, the images F1 to F3 of the camera 202 are influenced by white balance adjustment of the camera, the luminance of the image F2 and so forth, the images F1, F3 become darker than the images E1, G1 of other cameras that photograph the same area.

In this case, it is possible to match visual brightnesses to some extent by computing the respective luminance histograms 1811, 1812 of the images E1 and F1 that are the superposition area 1800 and by matching the gradation centroids thereof. A way of matching the gradation centroids of the luminance histograms will be described in FIG. 19. Although brightness adjustment of the plurality of camera images is performed in this way, there are various methods.

For example, first, in regard to the four superposition areas 1800 to 1803, the luminance histograms of the corresponding two images are computed and luminance adjustment is performed so as to match the gradation centroids thereof. Thereafter, in regard to the intermediate images E2, F2, G2, H2 sandwiched between the superposition areas, luminance adjustment is performed such that the results of adjustment in the respective superposition areas are gradationally joined with one another. For example, in the intermediate image F2, at a position close to the area 1800, a value close to the adjustment result of the area 1800 is set, and at a position close to the area 1802, a value close to the adjustment result of the area 1802 is set. Thereby, smooth luminance gradation is implemented.

Or, in regard to the front side image E2 and the rear side image G2, luminance adjustment may be performed so as to match the gradation centroids of the luminance histograms thereof and luminance adjustment of the images in the respective superposition areas may be performed so as to conform to a result of that adjustment. Then, in regard to the intermediate images F2, H2, luminance adjustment is performed so as to gradationally join the results of adjustment of the respective superposition areas with one another.

The procedure of these adjustments may be switched in accordance with the luminance histograms of the respective images. For example, in a case where a difference in luminance between the image E2 and the image F2 is larger than a predetermined threshold value, first, luminance adjustment of E2 and F2 is performed and then adjustment of other images is performed. By switching the order of adjustments in accordance with the situation in this way, it is possible to avoid the necessity for again performing the adjustment due to an increase in luminance difference between the adjacent images as a result of simply performing sequential adjustment of adjacent images.

Although, in the present example, the overhead view image of each camera is divided into three, a histogram distribution of the entire image of each camera may be computed and utilized without dividing it. For example, luminance adjustment of the images E1 to E3, F1 to F3 may be performed by computing the luminance histogram of the whole of the images E1 to E3 of the camera 201 and the luminance histogram of the whole of the images F1 to F3 of the camera 202 and matching the gradation centroids thereof.

Although, in the present example, the brightness of that image is estimated by the distribution of the luminance histogram, an average luminance, maximum/minimum luminances and so forth of images may be utilized. In a case where the average luminance of images is utilized, although it is not suited for fine control, a processing load can be reduced. In addition, although the luminance adjustment has been described, it may be matching of respective averages and centroids of Y, Cb, Cr values of YCbCr signals, adjustment of respective gradation distributions of RGB signals, and adjustment and matching of gradation distributions of respective elements in an HSV color space. Also color drift among the plurality cameras can be corrected by also utilizing color information not limited to the luminance.

FIG. 19 is a diagram showing a method of matching gradation centroids of luminance histograms. It means that luminance adjustment of the superposition area 1800 is performed by matching the gradation centroid of the image F1 of the camera 202 with the gradation centroid of the image E1 of the camera 201, for example, in the superposition area 1800 in FIG. 18. It is the same also in regard to other superposition areas.

On the left side of FIG. 19, the luminance histogram 1811 of the image E1 and the luminance histogram 1812 of the image F1 are shown and the gradation centroid of each of them is indicated by a mark ▲. The gradation centroids of both of them deviate from each other by a luminance difference h. A graph 1900 on the right side indicates a transformation formula of an output luminance relative to an input luminance and is solid-lined in the polygonal-line shape. A broken line is a straight line of a slope 1 and it is the case where the input and the output are equal to each other. Adjustment of the gradation centroid of the image E1 is performed by using this transformation formula.

In order to match the gradation centroid of the histogram 1812 of the image F1 with the gradation centroid of the histogram 1811 of the image E1, it is enough to deviate the gradation centroid of the histogram 1812 leftward by a correction amount h. On an input/output graph, this operation is, transformation of reducing the output luminance by the correction amount h is performed on the input luminance of the gradation centroid of the histogram 1812. Since a reduction in luminance of only one point leads to creation of an unnatural image, adjustment for continuously reducing the luminance including its surrounding is performed in the present example. Thereby, a pixel group having a luminance in the vicinity of the gradation centroid of the histogram 1812 of the image F1 is transformed into a pixel group that is small in luminance by h and it becomes possible to match it with the gradation centroid of the histogram 1811 of the image E1. That is, it becomes possible to make the visual brightness of the image F1 approximate to the brightness of the image E1.

Figure 20:
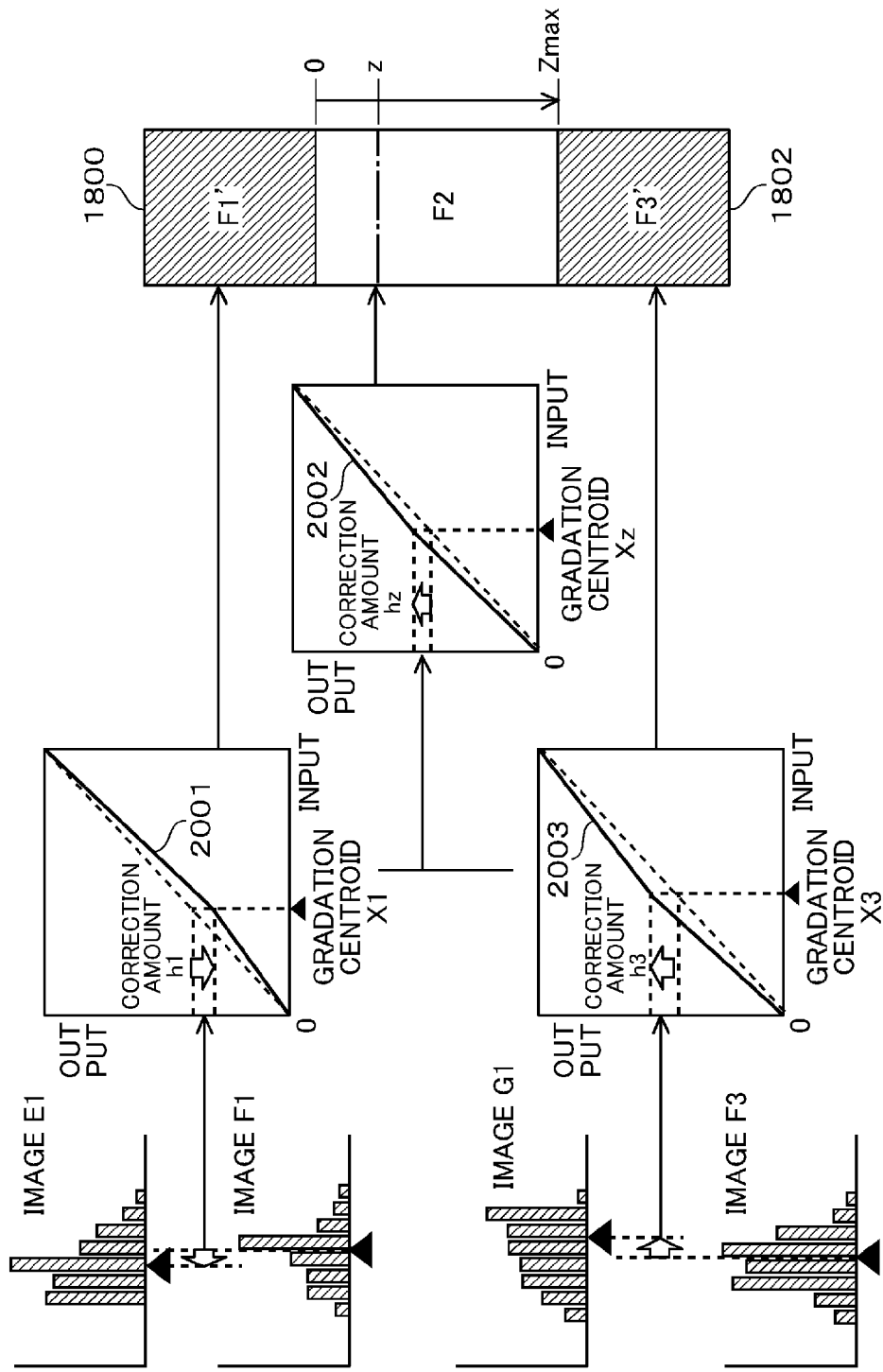
FIG. 20 is a diagram showing a method of performing luminance adjustment of an area sandwiched between the superposition areas.

FIG. 20 is a diagram showing a method of performing luminance adjustment of an area sandwiched between the superposition areas. Here, the overhead view images F1 to F3 of the camera 202 will be described by way of example.

First, in regard to the superposition area 1800, as described in FIG. 19, the luminance histograms of the image E1 and the image F1 are computed and a difference h1 in gradation centroid between both of them is corrected by using an input/output graph 2001. Thereby, a luminance-adjusted image F1' is obtained. Likewise, also in regard to the superposition area 1802, the luminance histograms of the image F3 and the image G1 are computed and a difference h3 in gradation centroid between both of them is corrected by using an input/output graph 2003. Thereby, a luminance-adjusted image F3' is obtained. In this example, a case where correction directions of the image F1 and the image F3 are reverse directions is shown and also the transformation formulae of the input/output graphs 2001, 2003 of both of them are reversed in an up-and-down direction.

Next, luminance adjustment of the image F2 sandwiched between the adjusted images F1', F3' of the two superposition areas 1800, 1802 is performed. A coordinate axis z is taken in a direction from the front side toward the rear side of the image F2. At a position of z=0 on a front end, luminance adjustment is performed on the basis of the input/output graph 2001, at a position of z=Zmax on a rear end, luminance adjustment is performed on the basis of the input/output graph 2003. At a midst position z, luminance adjustment is performed such that smooth gradation is established between z=0 to Zmax on the basis of an input/output graph 2002 that the input/output graphs 2001 and 2003 have been mixed together in accordance with the position z.

Specifically, assuming that X1 is the gradation centroid of the image F1, h1 is a correction amount, X3 is the gradation centroid of the image F3, h3 is a correction amount, a gradation centroid Xz and an output correction amount hz at the position z are given by $$Xz = X1 + (X3-X1) \times z/Zmax$$

$$Hz = h1 + (h3-h1) \times z/Zmax$$

and thereby Luminance adjustment of the image F2 is performed.

Thereby, luminance adjustment that is natural in gradation and is free from a strange feeling becomes possible in regard to the overhead view images F1 to F3 of the camera 202. The same processing is also performed on the other intermediate images E2, G2, H2 sandwiched between the superposition areas. Thereby, luminance correction of all of the images of the four cameras is performed by continuously performing correction in regard to the areas between them, in addition to luminance correction in the superposition areas.

Figure 21:
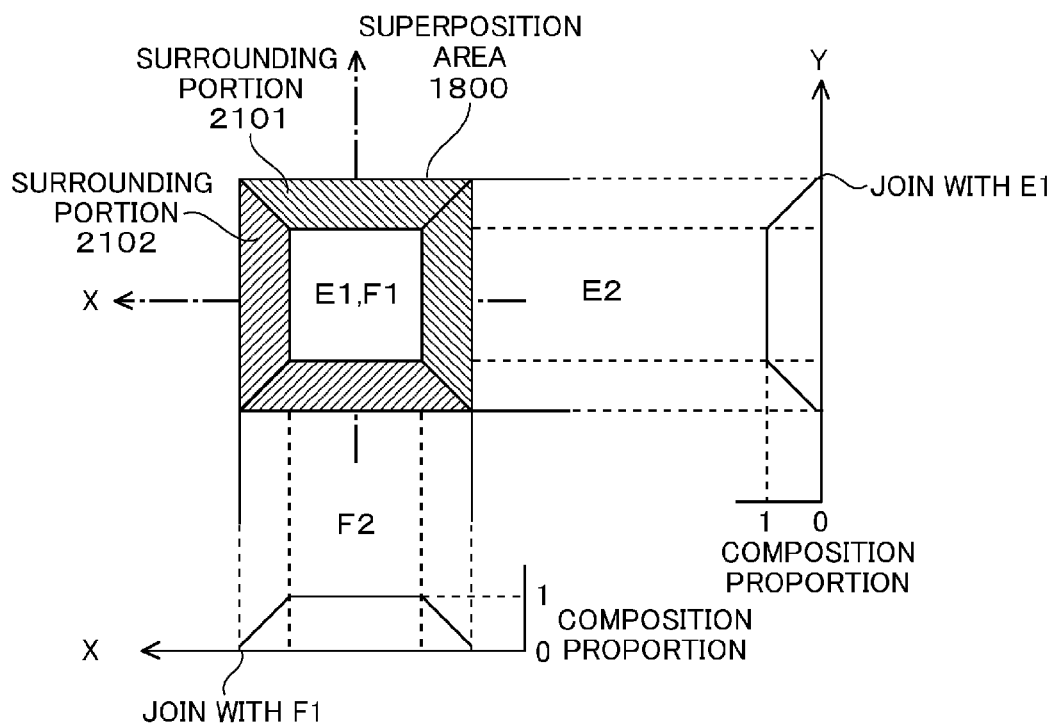
FIG. 21 is a diagram showing a composition method for a surrounding portion in the superposition area.

FIG. 21 is a diagram showing a composition method on a surrounding portion in the superposition area. When blending processing of the image is performed in the rectangular superposition area, there are cases where the boundary portion between the rectangles becomes conspicuous as the break depending on the blend rate. Therefore, although composition processing is performed on a central portion of the superposition area at the aforementioned blend rates, in regard to the surrounding portion in the superposition area, composition is performed with a slope such that it is smoothly connected with the images in areas adjacent to the superposition area. Description will be made by taking up two surrounding portions 2101, 2102 in the superposition area 1800 in FIG. 18 by way of example.

The upper side surrounding portion 2101 in the superposition area 1800 is close in distance from the front camera 201 in FIG. 18 and joining with the partial image E2 is strong. Therefore, a composition proportion thereof is gradually reduced with a slope from a predetermined blend rate so as to join with the partial image E1 of the camera 201 at a boundary position that the composition proportion is reduced to zero.

On the other hand, the left side surrounding portion 2102 in the superposition are 1800 is close in distance from the side camera 202 in FIG. 18 and joining with the partial image F2 is strong. Therefore, the composition proportion thereof is gradually reduced with a slope from the predetermined blend rate so as to join with the partial image F1 of the camera 202 at the boundary position that the composition proportion is reduced to zero.

By performing composition in this way, the superposition area 1800 will look natural with no break on the joints with the adjacent image E2 and the image F2. Incidentally, not only in a case where the images E1 and F1 overlap in the superposition area 1800 as in FIG. 18 but also in a case where they partially overlap, surroundings thereof can be smoothly composited.

Figure 22:
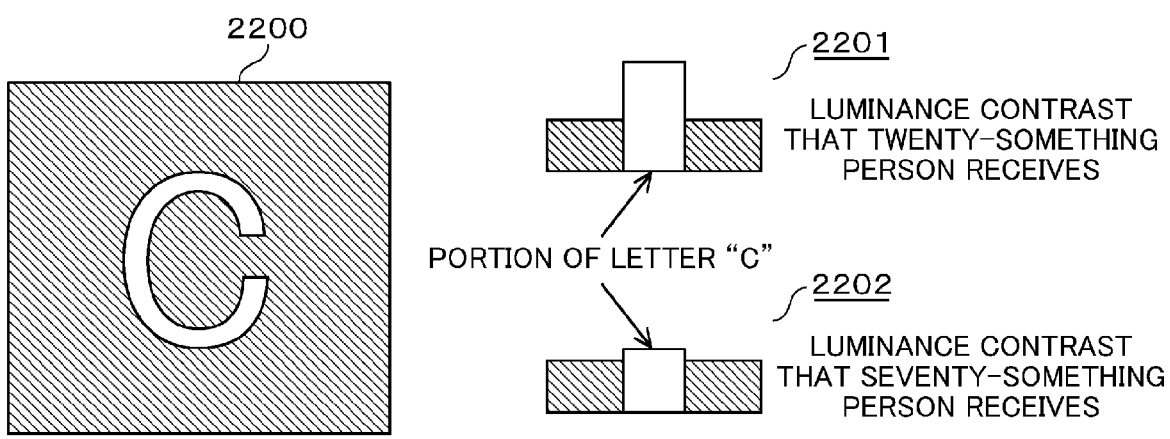
FIG. 22 is a diagram explaining a difference in feeling to luminance contrast by age.

FIG. 22 is a diagram explaining a difference in feeling to the luminance contrast depending on the age. Such an experimental result that when looking at a FIG. 2200, although a twenty-something person feels that the contrast between a letter "C" and its surrounding is large as shown by contrast 2201, a seventy-something person does not feel so much the contrast between the letter "C" and its surrounding as shown by contrast 2202 is reported in the field of human engineering (Standardization of Accessible Design Technology (AIST): Non-patent Literature). The blend rates of the superposition area are determined by reflecting the age of the user (the driver) by taking this result into account. Incidentally, age information on the driver is saved in the memory unit 107. Then, such processing that the older the age gets, the more a composition rate is raised by giving priority to the one that is larger, even if only slightly, in each image feature amount in the superposition area is performed.

For example, when the driver is young, the blend rates are determined by the computation formula of the slope in FIG. 5A. On the other hand, for an aged person, the blend rates are determined by using the computation formula that the slope has been made large as in FIG. 5B. Thereby, when the rate of object detection has been increased to some extent, processing of steeply increasing the blend rate of that image is performed so as to raise the contrast. In addition, processing of switching the strength of the contrast emphasis processing may be performed by the image conversion unit 105 in accordance with the age.

In regard to the blending processing according to the present embodiment, the image feature amounts Q1, Q2 may be computed at every pixel position and the blend rates P1, P2 may be computed at every pixel position. In addition, Q1, Q2 may be computed in the entire superposition area and composition may be performed by utilizing P1, P2 computed on the basis of them as uniform blend rates. In addition, after processing such that the contrast is expressed emphatically has been performed in regard to a result of composition, composition may be performed and contrast emphasis processing may be performed after composition. In addition, the overhead view image may be generated by utilizing digital mirrors that side-mirrors of the vehicle have been digitized as the side cameras 202, 204.

In blending processing in the abovementioned respective embodiments, further, restriction on a time change in blend rate will be described.

FIG. 23 is a diagram explaining restriction on an amount of change in blend rate. The vertical axis is the blend rate (P1 or P2) of one of the two cameras and the horizontal axis is a time. The time on the horizontal axis is expressed in terms of a number of frame periods, setting one scale as one frame period.

First, an example of the blend rate computation result described in each embodiment will be described for every frame. A dotted line in FIG. 23 shows an example that the blend rate that has been 0.8 up to the second frame changes to 0.5 in the third frame by computation of the blend rate, returns again to 0.8 in the fifth frame and again changes to 0.5 in the sixth frame. When applying the blend rate computation method described in each embodiment for every frame as it is in this way, for example, a change in blend rate between the second frame and the third frame becomes very sharp. In addition, a change between the fifth frame and the sixth frame is also sharp and such a satiation may occur also by noise. As a result, there is the possibility that flickering of the composite image may give the user an unpleasant feeling.

In order to improve this, a difference (the change amount) with a result of the next computation processing from a directly preceding result of the blend rate computation processing is restricted within a predetermined range. An example of a case where this has been applied is shown by a solid line in FIG. 23, and d in the drawing is a change restriction amount. In this example, the restriction amount d is set as 10% of a directly preceding blend rate. That is, a change in blend rate in one frame period is restricted within 10% of the directly preceding blend rate. For example, in a case where the blend rate that is normally computed by the computation method described in each embodiment becomes smaller than 90% of the blend rate that has been computed directly precedingly, 90% of the directly precedingly computed blend rate is set as a new blend rate computation result. Likewise, in a case where the normally computed blend rate becomes larger than 110% of the directly precedingly computed blend rate, 110% of the directly precedingly computed blend rate is set as a new blend rate computation result. Thereby, as apparent from observation of a process of change from the second frame to the ninth frame in FIG. 23, a gentle and natural change in blend rate can be implemented.

By using this method, it becomes possible to reduce or prevent a flickering feeling of the composite image that the user feels by reducing the sharp change in blend rate. Incidentally, although in the example in FIG. 23, it is made that the blend rate is computed for every frame, it may be every field and may be a frequency of one time for the predetermined number of frames.

REFERENCE SIGNS LIST

100: image processing device
101: n cameras
102: decoding unit
103: bus
104: CPU
105: image conversion unit
106: image detection unit
107: memory unit
108: encoding unit
109: monitor 200: vehicle
201: front camera
202: left side camera
203: rear camera
204: right side camera
205: pedestrian
300, 303, 305, 307: superposition area
1300: vehicle information acquisition unit

The invention claimed is:

1. An image processing system with an image conversion processor that composites overhead view images obtained by converting viewpoints of photographed images of a plurality of cameras, comprising:
an image detection processor that extracts image feature amounts from the photographed images,
wherein the image conversion processor performs composition by blending the overhead view images corresponding to a superposition area which are parts of the overhead view images generated from the photographed images of two of the plurality of cameras, at blend rates set in accordance with intensities of a correlation between the image feature amounts of the photographed images extracted by the image detection processor, in the superposition area that is photographed by the two cameras overlappingly.

2. The image processing system according to claim 1, wherein the image feature amounts are a position of a pixel from which an edge is extracted or a magnitude of the luminance of the edge.

3. The image processing system according to claim 2, wherein the image conversion processor, in a case where it has been assessed that the correlation between the image feature amounts in the superposition area is weak, assesses whether there exists an overlapping portion among the position of the pixel from which the edge is extracted as the image feature amounts, and
in a case where it has been assessed that there exists the overlapping portion, performs composition by blending at the blend rates in accordance with magnitudes of the image feature amounts.

4. The image processing system according to claim 2, wherein the image conversion processor, in a case where it has been assessed that the correlation between the image feature amounts in the superposition area is weak, assesses whether there exists an overlapping portion among the position of the edge as the image feature amounts, and
in a case where it has been assessed that there is no overlapping portion, performs composition by selecting an overhead view image that is larger in the image feature amount.

5. The image processing system according to claim 1, wherein the image conversion processor, in a case where it has been assessed that the correlation between the overhead view images in the superposition area is strong, sets the blend rates in accordance with distances from the two cameras to the superposition area.

6. The image processing system according to claim 1, wherein the image detection processor detects motion vectors in the photographed images as the image feature amounts, and
the image conversion processor sets the blend rates in accordance with motion vector amounts of the overhead view images in the superposition area.

7. The image processing system according to claim 1, wherein the image detection processor computes luminance histograms and gradation centroids of the respective camera images as the image feature amounts, and
the image conversion processor adjusts a luminance such that the gradation centroids of the respective images in the superposition area match in accordance with the calculated luminance histograms and gradation centroids.

8. The image processing system according to claim 7, wherein the image conversion processor adjusts the luminance of the image in an area other than the superposition area so as to be joined gradationally by using a result of luminance adjustment in the superposition area.

9. The image processing system according to claim 1, wherein the image conversion processor performs image composition by changing the blend rates with a slope toward an area that is adjacent to the superposition area in regard to a surrounding portion in the superposition area.

10. The image processing system according to claim 1, wherein the image conversion processor performs image composition by changing a slope of a computation formula of the blend rate to be applied to the superposition area in accordance with the age of a user.

11. The image processing system according to claim 1, wherein the image conversion processor computes the blend rate in every predetermined period and restricts a change in blend rate before and after the predetermined period concerned within a predetermined range.

12. An image processing system that composites photographed images from a plurality of cameras to generate an overhead view image, comprising:
an image detection processor that extracts image feature amounts from the photographed images;
an image conversion processor that performs composition by blending the photographed images corresponding to a superposition area which are parts of the overhead view image generated from the photographed images of two of the plurality of cameras, at blend rates set in accordance with intensities of a correlation between the image feature amounts of the photographed images extracted by the image detection processor, in the superposition area that is photographed by the two cameras overlappingly; and
a vehicle information acquisition unit that acquires vehicle control information indicating a traveling state of a vehicle to which the image processing system concerned is applied,
wherein the image conversion processor sets a degree of danger in the superposition area from the acquired vehicle control information and outputs the composited overhead view image in combination with a display system according to the degree of danger.

13. The image processing system according to claim 12, wherein as the vehicle control information, any of a direction of movement of the vehicle, an angle of a steering wheel and a vehicle speed is included, and
the image conversion processor performs composition by improving contrast of an image to be displayed in an area the degree of danger of which has been set high.

14. An image processing method of compositing photographed images from a plurality of cameras to generate an overhead view image, comprising:
extracting image feature amounts from the photographed images; and computing blend rates in accordance with intensities of a correlation between the image feature amounts of the photographed images and compositing overhead view images by blending the overhead view images corresponding to a superposition area which are parts of the overhead view images generated from the photographed images of two of the plurality of cameras, at the blend rates computed in accordance with the intensities of the correlation between the image feature amounts of the photographed images, in the superposition area that is photographed by the two cameras overlappingly, wherein in compositing the overhead view images, the correlation between the image feature amounts of the photographed images in the superposition area is assessed and composition is performed by switching a blending method in accordance with the strength of the correlation.

15. An image processing method of compositing photographed images from a plurality of cameras to generate an overhead view image, comprising:

extracting image feature amounts from the photographed images;

computing blend rates in accordance with intensities of a correlation between the image feature amounts of the photographed images, and compositing overhead view images by blending the overhead view images corresponding to a superposition area which are parts of the overhead view images generated from the photographed images of two of the plurality of cameras, at the blend rates computed in accordance with the intensities of the correlation between the image feature amounts of the photographed images, in the superposition area that is photographed by the two cameras overlappingly; and acquiring vehicle control information indicating a traveling state of a vehicle to which the image processing system concerned is applied, wherein in compositing the overhead view images, a degree of danger in the superposition area is set from the acquired vehicle control information and the composited overhead view image is output in combination with a display system according to the degree of danger.

* * * * *